United States Patent [19]

Tzikas et al.

[11] Patent Number: 5,391,717
[45] Date of Patent: Feb. 21, 1995

[54] BISREACTIVE AZO DYES CONTAINING A PYRIDINE COUPLING COMPONENT

[75] Inventors: Athanassios Tzikas, Pratteln; Rolf Deitz, Basel, both of Switzerland

[73] Assignee: Ciba-Geigy Corporation, Ardsley, N.Y.

[21] Appl. No.: 94,645

[22] Filed: Jul. 19, 1993

[30] Foreign Application Priority Data

Jul. 23, 1992 [CH] Switzerland .......... 2349/92

[51] Int. Cl.⁶ ............. C09B 62/006; C09B 62/026; C09B 62/08; C09B 62/507; C09B 67/22; D06P 1/38
[52] U.S. Cl. .................... 534/635; 534/642; 8/549
[58] Field of Search ........... 534/635, 642; 8/549

[56] References Cited

U.S. PATENT DOCUMENTS

| | | | |
|---|---|---|---|
| 4,033,943 | 7/1977 | Ramanathan et al. | 534/635 |
| 4,473,499 | 9/1984 | Niwa et al. | 534/635 |
| 4,500,455 | 2/1985 | Niwa et al. | 534/635 |
| 4,515,716 | 5/1985 | Niwa | 534/635 |
| 4,534,908 | 8/1985 | Fuchs et al. | 534/642 X |
| 4,585,460 | 4/1986 | Schwander et al. | 534/642 X |
| 4,786,721 | 11/1988 | Tzikas et al. | 435/642 X |
| 4,801,694 | 1/1989 | Scheibli et al. | 534/635 X |
| 5,106,960 | 4/1992 | Hurter et al. | 534/845 |
| 5,233,026 | 8/1993 | Tzikas | 534/635 X |
| 5,298,607 | 3/1994 | Seiler et al. | 534/642 X |

FOREIGN PATENT DOCUMENTS

| | | |
|---|---|---|
| 0043575 | 1/1982 | European Pat. Off. |
| 3227253 | 2/1983 | Germany. |
| 1377505 | 12/1974 | United Kingdom. |
| 1377506 | 12/1974 | United Kingdom. |
| 1419330 | 12/1975 | United Kingdom. |
| 2142926 | 1/1985 | United Kingdom ......... 534/635 |

*Primary Examiner*—Mary C. Lee
*Assistant Examiner*—Fiona T. Powers
*Attorney, Agent, or Firm*—Kevin T. Mansfield

[57] ABSTRACT

Reactive dyes of the formula

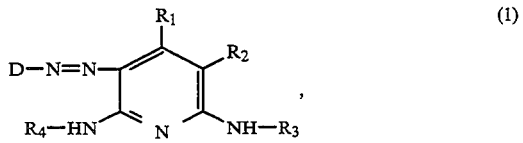

(1)

in which D, $R_1$, $R_2$, $R_3$ and $R_4$ are as defined in claim 1, are particularly suitable for dyeing or printing cellulosic fiber materials or naturally occurring or synthetic polyamide fiber materials with a high tinctorial yield, and produce dyeings and prints having good fastness properties.

12 Claims, No Drawings

BISREACTIVE AZO DYES CONTAINING A PYRIDINE COUPLING COMPONENT

The present invention relates to novel reactive dyes, process for their preparation and their use for dyeing or printing fibre materials.

The practice of dyeing using reactive dyes has recently led to increased requirements on the quality of the dyeings and the economy of the dyeing process. Consequently, there continues to be a demand for novel reactive dyes which have improved properties, in particular in respect of application.

Reactive dyes which have an adequate substantivity and at the same time readily permit the non-fixed portions to be washed out are now required for dyeing. Furthermore, they should have a good tinctorial yield and a high reactivity, and dyeings with high degrees of fixing in particular should be produced. These requirements are not met in all their characteristics by the known dyes.

The present invention is therefore based on the object of discovering novel improved reactive dyes which can be used for dyeing and printing fibre materials and have the qualities characterised above to a high degree. In particular, the novel dyestuffs should be distinguished by high fixing yields and high fibre-dye bond stabilities, and the portions not fixed on the fibre moreover should be easy to wash out. They should furthermore produce dyeings having good all-round properties, for example fastnesses to light and to wet conditions.

It has been found that the object described can be largely achieved using the novel reactive dyes defined below.

The invention therefore relates to reactive dyes of the formula

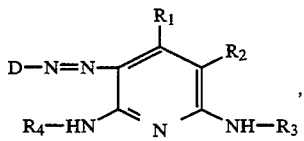

(1)

in which D is the radical of a diazo compound of the benzene or naphthalene series or the radical of a mono- or disazo dye, $R_1$ is $C_1$–$C_4$alkyl, $R_2$ is cyano, carbamoyl or sulfomethyl and $R_3$ and $R_4$ independently of one another are hydrogen or $C_1$–$C_{12}$alkyl which is unsubstituted or substituted and, with the exception of methyl, may be interrupted by oxygen, the reactive dye of the formula (1) containing at least two fibre-reactive radicals, at least one fibre-reactive radical being contained in the radical $R_3$ or $R_4$, or the radical D containing a fibre-reactive radical of the halopyrimidine or halotriazine series which is unsubstituted or further substituted, and the reactive dye of the formula (1) contains at least one permanent sulfo or sulfato group.

Examples of substituents in the radical D are: alkyl groups having 1 to 12 carbon atoms, in particular 1 to 4 carbon atoms, such as methyl, ethyl, propyl, isopropyl or butyl, alkoxy groups having 1 to 8 carbon atoms, in particular 1 to 4 carbon atoms, such as methoxy, ethoxy, propoxy, isopropoxy or butoxy, alkanoylamino groups having 2 to 8 carbon atoms, in particular 2 to 4 carbon atoms, such as acetylamino or propionylamino, phenyl- or naphthylamino, alkoxycarbonylamino groups having 2 to 8 carbon atoms, in particular 2 to 4 carbon atoms, alkanoyl groups having 2 to 8 carbon atoms, in particular 2 to 4 carbon atoms, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, phenyl- or naphthylsulfonyl, alkoxycarbonyl having 1 to 4 carbon atoms in the alkoxy radical, such as methoxycarbonyl or ethoxycarbonyl, benzoyl, benzoylamino which is unsubstituted or substituted by $C_1$–$C_4$alkyl on the nitrogen, phenyl, naphthyl, amino, amino which is mono- or disubstituted by $C_1$–$C_{12}$alkyl, phenyl or naphthyl, trifluoromethyl, nitro, cyano, hydroxyl, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-($\beta$-hydroxyethyl)-sulfamoyl, N,N-di-($\beta$-hydroxyethyl)-sulfamoyl, N-phenylsulfamoyl, ureido, carboxyl, sulfomethyl, sulfo or sulfato, and fibre-reactive radicals, it being possible for the substituents containing an alkyl, phenyl or naphthyl radical to be further substituted in the alkyl, phenyl or naphthyl radical, for example by the substituents defined above for D. The alkyl radicals furthermore can be interrupted by oxygen (—O—).

Fibre-reactive radicals are to be understood as meaning those which are capable of reacting with the hydroxyl groups of cellulose, the amino, carboxyl, hydroxyl and thiol groups of wool and silk or the amino and any carboxyl groups of synthetic polyamides to form covalent chemical bonds. The fibre-reactive radicals as a rule are bonded to the dye radical directly or via a bridge member. Suitable fibre-reactive radicals are, for example, those which contain at least one removable substituent on an aliphatic, aromatic or heterocyclic radical, or in which the radicals mentioned contain a radical suitable for reaction with the fibre material, for example a vinyl radical.

Permanent sulfo or sulfato groups are to be understood as meaning those which are not removed during reaction of the reactive dye with the fibre material. The reactive dyes of the formula (1) preferably contain 1 to 5, in particular 1 to 3, permanent sulfo or sulfato groups.

The reactive dyes of the formula (1) contain at least two fibre-reactive radicals, in particular two or three fibre-reactive radicals.

Suitable fibre-reactive radicals in the reactive dye of the formula (1), which may be bonded to the radical D, to the radical $R_3$ or to the radical $R_4$ are:

a) reactive radicals of the formulae

 (2a)

 (2b)

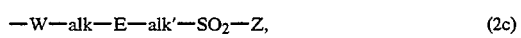 (2c)

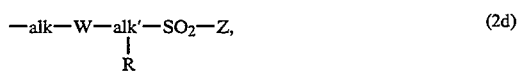 (2d)

-continued

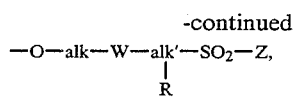 (2e)

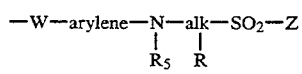 (2f)

or

—NH—CO—Z₁, (2g)

in which W is a group of the formula —SO₂—NR₅—, —CONR₅— or —NR₅CO—,

R₅ is hydrogen, C₁-C₄alkyl which is unsubstituted or substituted by hydroxyl, sulfo, sulfato, carboxyl or cyano, or is a radical of the formula

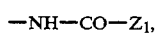

R is hydrogen, hydroxyl, sulfo, sulfato, carboxyl, cyano, halogen, C₁-C₄alkoxycarbonyl, C₁-C₄alkanoyloxy, carbamoyl or the group —SO₂-Z, Z is a group of the formula —CH=CH₂ or —CH₂—CH₂-U₁ and U₁ is a leaving group, Z₁ is a group of the formula

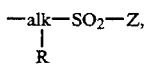

and Hal is halogen,

E is the radical —O— or —NR₆, and

R₆ is hydrogen or C₁-C₄alkyl, alk and alk' independently of one another are C₁-C₆alkylene and arylene is a phenylene or naphthylene radical each of which is unsubstituted or substituted by sulfo, carboxyl, C₁—C₄alkyl, C₁-C₄alkoxy or halogen;

b) reactive radicals of the halotriazine or halopyrimidine series, in particular those of the formulae

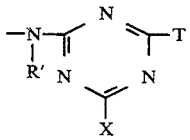 (3)

and

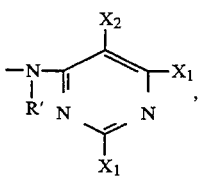 (4)

in which R' is hydrogen or C₁-C₁₂alkyl which is unsubstituted or substituted and, with the exception of methyl, may be interrupted by oxygen, and the radical —(NR')— can be a divalent 5- to 7-membered aliphatic heterocyclic radical, X is a group which can be removed as an anion and T is a group which can be removed as an anion, a non-reactive radical or a reactive radical of the formula

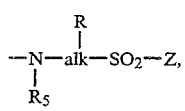 (5a)

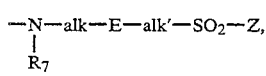 (5b)

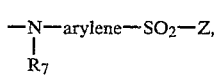 (5c)

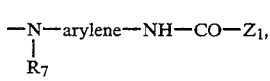 (5d)

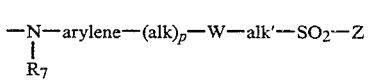 (5e)

or

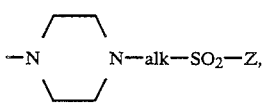 (5f)

in which R, R₅, E, W, Z, Z₁, alk, alk' and arylene are as defined above,

R₇ is hydrogen or C₁-C₄alkyl and p is 0 or 1, one of the radicals X₁ is a group which can be removed as an anion and the other radical X₁ is a non-reactive substituent or a radical of the formulae (5a) to (5f) or is a group which can be removed as an anion and X₂ is a negative substituent.

Examples of suitable leaving groups U₁ are —Cl, —Br, —F, —OSO₃H, —SSO₃H, —OCO—CH₃, —O-PO₃H₂, —OCO—CCl₃, —OCO—CHCl₂, —O-CO—CH₂Cl, —OSO₂—C₁-C₄alkyl, —OSO₂—N(-C₁-C₄alkyl)₂ or —OCO—C₆H₅.

U₁ is preferably a group of the formula —Cl, —O-SO₃H, —SSO₃H, —OCO—CH₃, —OCO—C₆H₅ or —OPO₃H₂, in particular —Cl or —OSO₃H, preferably —OSO₃H.

Alk and alk' independently of one another are, for example, a methylene, ethylene, 1,3-propylene, 1,4-butylene, 1,5-pentylene or 1,6-hexylene radical or branched isomers thereof.

Alk and alk' are preferably a C₁-C₄alkylene radical, and particularly preferably an ethylene radical.

Arylene is preferably a 1,3- or 1,4-phenylene radical, which is unsubstituted or, for example, substituted by sulfo, methyl, methoxy or carboxyl.

R is preferably hydrogen.

R₅ is preferably hydrogen or C₁-C₄alkyl, such as methyl, ethyl, propyl, isopropyl, butyl, isobutyl, sec-butyl or tert-butyl. R₅ is particularly preferably hydrogen.

R₇ is preferably hydrogen, methyl or ethyl, in particular hydrogen.

E is preferably —NH— or —O—, and particularly preferably —O—.

W is preferably a group of the formula —CONH— or —NHCO—, in particular a group of the formula —CONH—.

Hal in the radical $Z_1$ is preferably chlorine or, in particular, bromine.

Preferred reactive radicals of the formulae (2a) to (2g) are those in which W is a group of the formula —CONH— or —NHCO—, R and $R_5$ are hydrogen, E is the radical —O— or —NH—, Hal is chlorine or bromine and $U_1$ is a group of the formula —Cl, —O-$SO_3$H, —$SSO_3$H, —OCO—$CH_3$, —OCO—$C_6H_5$ or —O$PO_3H_2$, in particular a group of the formula —Cl or —O$SO_3$H.

R' is preferably hydrogen or $C_1$-$C_2$alkyl which is unsubstituted or substituted by hydroxyl, sulfo or sulfato and, with the exception of methyl, may be interrupted by oxygen, or the radical —(NR')— is a divalent 5- to 7-membered aliphatic heterocyclic radical.

A 5- to 7-membered aliphatic heterocyclic radical —(NR')— is, in particular, the radical of the formula

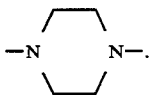

The radical R' can be interrupted by oxygen, for example by 1 to 3, in particular 1 or 2 —O— radicals.

R' is preferably hydrogen or $C_1$-$C_{12}$alkyl, in particular $C_1$-$C_8$alkyl, which is unsubstituted or substituted by hydroxyl, sulfo or sulfato and, with the exception of methyl, may be interrupted by 1 to 3 —O— radicals, or the radical —(NR')— is a radical of the formula

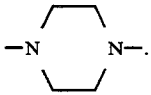

Examples of R' are methyl, ethyl, propyl, isopropyl, butyl, isobutyl, sec-butyl, tert-butyl or straight-chain or branched pentyl, hexyl or octyl, 2-hydroxyethyl, 3-hydroxypropyl, 2-sulfatoethyl, 3-sulfatopropyl, 2-sulfoethyl, 3-sulfopropyl, 2-methoxyethyl, 3-methoxypropyl and radicals of the formulae —($CH_2$)$_2$—O—($CH_2$)$_2$—OH and —($CH_2$)$_2$—O—($CH_2$)$_2$—O$SO_3$H.

R' is especially preferably hydrogen or $C_1$-$C_4$alkyl, in particular hydrogen, methyl or ethyl. An especially important definition of R' is hydrogen.

X is, for example, halogen, such as fluorine, chlorine or bromine, sulfo, $C_1$-$C_4$alkylsulfonyl or phenylsulfonyl, and preferably halogen, in particular fluorine or chlorine.

A group T which can be removed as an anion is, for example, halogen, such as fluorine, chlorine or bromine, sulfo, $C_1$-$C_4$alkylsulfonyl or phenylsulfonyl, and preferably halogen, in particular fluorine or chlorine.

A non-reactive radical T can be, for example, hydroxyl, $C_1$-$C_4$alkoxy, $C_1$-$C_4$alkylthio, morpholino or unsubstituted or substituted amino. Unsubstituted or substituted amino T is unsubstituted amino or, for example, N-$C_1$-$C_4$alkylamino or N,N-di-$C_1$-$C_4$alkylamino, in which the alkyl is unsubstituted or substituted, for example, by sulfo, sulfato, hydroxyl, carboxyl or phenyl, cyclohexylamino, N-$C_1$-$C_4$alkyl-N-phenylamino or phenylamino or naphthylamino, in which the phenyl or naphthyl is unsubstituted or substituted, for example, by $C_1$-$C_4$alkyl, $C_1$-$C_4$alkoxy, $C_2$-$C_4$alkanoylamino, carboxyl, sulfo or halogen.

Examples of suitable non-reactive radicals T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A non-reactive radical T is preferably $C_1$-$C_4$alkoxy, $C_1$-$C_4$alkylthio, hydroxyl, amino, N-$C_1$-$C_4$alkylamino, which is unsubstituted in the alkyl part or substituted by hydroxyl, sulfato or sulfo, morpholino, phenylamino or N-$C_1$-$C_4$alkyl-N-phenylamino, in which the phenyl in each case is unsubstituted or substituted by sulfo, carboxyl, acetylamino, methyl or methoxy.

Non-reactive radicals T are especially preferably $C_1$-$C_4$alkoxy, morpholino, phenylamino or N-$C_1$-$C_4$alkyl-N-phenylamino, in which the phenyl in each case is unsubstituted or substituted by sulfo, carboxyl, acetylamino, methyl or methoxy.

Reactive radicals T which are suitable and preferred are compounds of the formulae (5a) to (5f) in which R, $R_5$, $R_7$, E, W, Z, $Z_1$, alk, alk' and arylene are as defined as preferred above.

Preferred reactive radicals T are those of the compounds of the formulae (5a) to (5f) in which W is a group of the formula —CONH— or —NHCO—, R, $R_5$ and $R_7$ are hydrogen, E is the radical —O— or —NH—, Hal is chlorine or bromine and $U_1$ is a group of the formula —Cl, —O$SO_3$H, —$SSO_3$H, —OCO—$CH_3$, —OCO—$C_6H_5$ or —O$PO_3H_2$, in particular a group of the formula —Cl or —O$SO_3$H.

Very particularly preferred reactive radicals T are those of compounds of the formulae (5a) to (5f) in which W is a group of the formula —CONH—, R, $R_5$ and $R_7$ are hydrogen, E is the radical —O—, Hal is chlorine or bromine and $U_1$ is a group of the formula —Cl or —O$SO_3$H, in particular a group of the formula —O$SO_3$H.

T is preferably halogen, hydroxyl, sulfo, $C_1$-$C_4$alkoxy, $C_1$-$C_4$alkylthio, $C_1$-$C_4$alkylsulfonyl, phenylsulfonyl, morpholino, unsubstituted or substituted amino or a reactive radical of the formulae (5a) to (5f), which is as defined and as preferred above.

T is particularly preferably chlorine, fluorine, $C_1$-$C_4$alkoxy, morpholino, N-$C_1$-$C_4$alkyl-N-phenylamino or phenylamino, in which the phenyl is in each case unsubstituted or substituted by sulfo, carboxyl, acetylamino, methyl or methoxy, or is a reactive radical of the formulae (5a) to (5f), which is as defined and as preferred above.

The radical $X_1$ which can be removed as an anion is preferably halogen, in particular fluorine or chlorine.

A non-reactive substituent $X_1$ is as defined and preferred above, for example, for a non-reactive substituent T.

The radical $X_1$ is particularly preferably halogen, in particular fluorine or chlorine.

Examples of suitable radicals $X_2$ are nitro, cyano, $C_1$-$C_4$alkylsulfonyl, carboxyl, chlorine, hydroxyl, $C_1$-$C_4$alkoxysulfonyl, $C_1$-$C_4$alkylsulfinyl, $C_1$-$C_4$alkoxycarbonyl or $C_2$-$C_4$alkanoyl, preferably chlorine, cyano and methylsulfonyl for $X_2$. $X_2$ is particularly preferably halogen, in particular chlorine.

Preferred reactive radicals of the formula (3) are those in which X is halogen and T is defined as preferred above.

Preferred reactive radicals of the formula (4) are those in which the two substituents $X_1$ are halogen, in particular chlorine or fluorine, and $X_2$ is halogen, in particular chlorine.

Particularly preferred reactive radicals of the formula (4) are those in which the two substituents $X_1$ are fluorine or chlorine and $X_2$ is chlorine.

The reactive dyes of the formula (1) preferably contain as fibre-reactive groups a reactive radical of the formulae (2a) to (2g) or a reactive radical of the formula (3) or (4) in which R' is hydrogen or $C_1$–$C_{12}$alkyl which is unsubstituted or substituted by hydroxyl, sulfo or sulfato and, with the exception of methyl, may be interrupted by oxygen, or the radical —(NR')— is a divalent 5- to 7-membered aliphatic heterocyclic radical, X, $X_1$ and $X_2$ are halogen and T is halogen, hydroxyl, sulfo, $C_1$–$C_4$alkoxy, $C_1$–$C_4$alkylthio, $C_1$–$C_4$alkylsulfonyl, phenylsulfonyl, morpholino or unsubstituted or substituted amino, or T is a fibre-reactive radical of the formulae (5a) to (5f), and the reactive radicals of the formulae (2a) to (2g), (3) and (4) are as defined and as preferred above.

$C_1$–$C_4$alkyl $R_1$ is methyl, ethyl, propyl, isopropyl, butyl, isobutyl, sec-butyl or tert-butyl, in particular methyl.

$R_2$ is preferably cyano or carbamoyl.

Substituents of the radicals $R_3$ and $R_4$ are, for example, hydroxyl, sulfo, sulfato, reactive radicals of the halotriazine or halopyrimidine series, in particular reactive radicals of the formulae (3) and (4) as defined above, and phenyl or naphthyl, in which the phenyl and naphthyl radicals are unsubstituted or further substituted by $C_1$–$C_4$alkyl, $C_1$–$C_4$alkoxy, $C_2$–$C_4$alkanoylamino, halogen or sulfo.

$R_3$ and $R_4$ independently of one another are preferably hydrogen, $C_1$–$C_{12}$alkyl which is unsubstituted or substituted by hydroxyl, sulfo or sulfato and, with the exception of methyl, may be interrupted by oxygen, or a radical of the formula $$-B-N-Y_1, \quad (6)$$
$$\phantom{-B-N}|$$
$$\phantom{-B-N}R'$$

in which R' is hydrogen or is $C_1$–$C_{12}$alkyl which is unsubstituted or substituted by hydroxyl, sulfo or sulfato and, with the exception of methyl, may be interrupted by oxygen, or the radical —(NR')— is a divalent 5- to 7-membered aliphatic heterocyclic radical, B is $C_2$–$C_{12}$alkylene which is unsubstituted or substituted by hydroxyl, sulfo or sulfato, and may be interrupted by oxygen, and $Y_1$ is a reactive radical of the formula

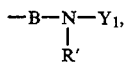

(7)

or

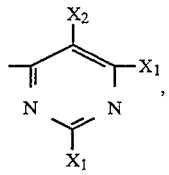

(8)

in which T, X, $X_1$ and $X_2$ are as defined and as preferred above.

The radicals $R_3$ and $R_4$ can thus be either non-reactive radicals or reactive radicals.

The radicals B, $R_3$ and $R_4$ can be interrupted by oxygen, for example by 1 to 3, in particular 1 or 2 —O— radicals.

The radical B is preferably $C_2$–$C_8$alkylene, which is unsubstituted or substituted by hydroxyl, sulfo or sulfato and may be interrupted by 1 to 3, in particular 1 or 2 —O— radicals.

The radical B is particularly preferably $C_2$–$C_6$alkylene, in particular 1,2-ethylene, 1,3-propylene or 1,6-hexylene.

Non-reactive radicals $R_3$ and $R_4$ are preferably hydrogen or $C_1$–$C_8$alkyl which is unsubstituted or substituted by hydroxyl, sulfo or sulfato and, with the exception of methyl, may be interrupted by 1 to 3, in particular 1 or 2, —O— radicals.

Examples of non-reactive radicals $R_3$ and $R_4$ are methyl, ethyl, propyl, isopropyl, butyl, isobutyl, sec-butyl, tert-butyl or straight-chain or branched pentyl, hexyl or octyl, 2-hydroxyethyl, 3-hydroxypropyl, 2-sulfatoethyl, 3-sulfatopropyl, 2-sulfoethyl, 3-sulfopropyl, 2-methoxyethyl, 3-methoxypropyl and radicals of the formulae —$(CH_2)_2$—O—$(CH_2)_2$—OH and —$(CH_2)_2$—O—$(CH_2)_2$—$OSO_3H$.

Preferred reactive radicals $R_3$ and $R_4$ are those of the formula (6) in which B and R' are as defined and as preferred above, X is halogen and T is halogen, hydroxyl, sulfo, $C_1$–$C_4$alkoxy, $C_1$–$C_4$alkylthio, $C_1$–$C_4$alkylsulfonyl, phenylsulfonyl, morpholino or unsubstituted or substituted amino, the two substituents $X_1$ are halogen, in particular chlorine or fluorine, and $X_2$ is halogen, in particular chlorine.

Very particularly preferred reactive radicals $R_3$ and $R_4$ are those of the formula (6) in which R' is hydrogen or $C_1$–$C_{12}$alkyl, in particular $C_1$–$C_8$alkyl, which is unsubstituted or substituted by hydroxyl, sulfo or sulfato and, with the exception of methyl, may be interrupted by 1 to 3 —O— radicals, or the radical —(NR')— is a radical of the formula

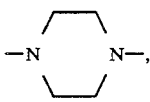

B is $C_2$–$C_8$alkylene which is unsubstituted or substituted by hydroxyl, sulfo or sulfato and may be interrupted by 1 to 3 —O— radicals, X is fluorine or chlorine, T is fluorine, chlorine, $C_1$–$C_4$alkoxy, morpholino, N-$C_1$–$C_4$alkyl-N-phenylamino or phenylamino, in which the phenyl in each case is unsubstituted or substituted by sulfo, carboxyl, acetylamino, methyl or methoxy, in particular sulfo, the two substituents $X_1$ are fluorine or chlorine and $X_2$ is chlorine. $Y_1$ here is in particular a radical of the formula (7).

The radical D is preferably a radical of the benzene or naphthalene series or the radical of a monoazo dye which contains a diazo component of the benzene or naphthalene series and a coupling component of the benzene or naphthalene series, in which the said benzene and naphthalene radicals are unsubstituted or substituted by $C_1$–$C_4$alkyl, $C_1$–$C_4$alkoxy, $C_2$–$C_4$alkanoylamino, halogen, sulfo or a reactive radical of the formulae (2a) to (2g), (3) or (4), in particular a radical of the formulae (2a) to (2g). The reactive radicals of the formulae (2a) to (2g), (3) and (4) are defined as preferred above.

Particularly preferred reactive dyes are those of the formulae

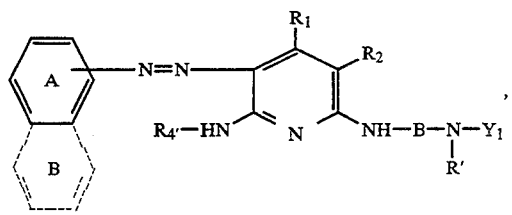
(9a)

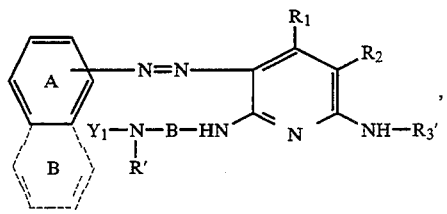
(9b)

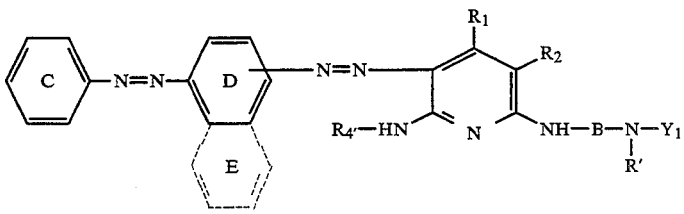
(10a)

and

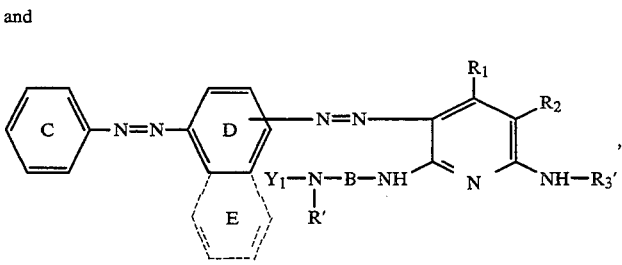
(10b)

in which $R_1$ is $C_1$–$C_4$alkyl, $R_2$ is cyano, carbamoyl or sulfomethyl, $R'$, $R_3'$ and $R_4'$ independently of one another are hydrogen or $C_1$–$C_{12}$alkyl which is unsubstituted or substituted by hydroxyl, sulfo or sulfato and, with the exception of methyl, may be interrupted by oxygen, the radical —(NR')— can be a divalent 5- to 7-membered aliphatic heterocyclic radical, B is $C_2$–$C_{12}$alkylene which is unsubstituted or substituted by hydroxyl, sulfo or sulfato and may be interrupted by oxygen, the rings A, B, C, D and E independently of one another are unsubstituted or substituted by $C_1$–$C_4$alkyl, $C_1$–$C_4$alkoxy, $C_2$–$C_4$alkanoylamino, halogen, sulfo or a reactive radical of the formulae (2a) to (2g) and $Y_1$ is a fibre-reactive radical of the formula (7) or (8).

Reactive dyes which are likewise particularly preferred are those of the formulae

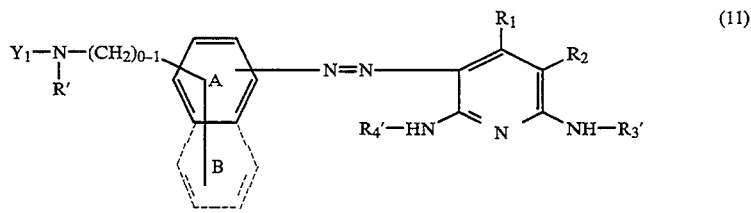
(11)

and

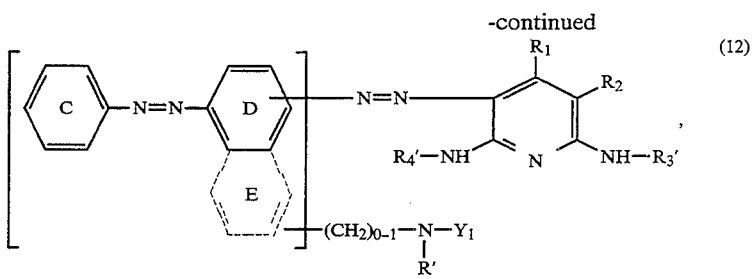

in which $R_1$ is $C_1$-$C_4$alkyl, $R_2$ is cyano, carbamoyl or sulfomethyl, $R'$, $R_3'$ and $R_4'$ independently of one another are hydrogen or $C_1$-$C_{12}$alkyl which is unsubstituted or substituted by hydroxyl, sulfo or sulfato and, with the exception of methyl, may be interrupted by oxygen, the radical —(NR')— may be a divalent 5- to 7-membered aliphatic heterocyclic radical, the tings A, B, C, D and E independently of one another are unsubstituted or substituted by $C_1$-$C_4$alkyl, $C_1$-$C_4$alkoxy, $C_2$-$C_4$alkanoylamino, halogen, sulfo or a reactive radical of the formulae (2a) to (2g), and $Y_1$ is a fibre-reactive radical of the formula (7) or (8).

The radicals $R_1$, $R_2$, $R'$, $B$, $Y_1$ of the formula (7) or (8) and the radicals of the formulae (2a) to (2g) as substituents of the tings A, B, C, D and E are as defined and as preferred above. The radicals $R_3'$ and $R_4'$ are the non-reactive radicals $R_3$ and $R_4$ as defined above as preferred.

The invention furthermore relates to mixtures of reactive dyes which comprise at least two reactive dyes of the formula (1), the reactive dyes of the formula (1) being as preferred above.

Reactive dyes of the formula (1) in which $R_3$ and $R_4$ differ from one another are as a rule in the form of mixtures of two reactive dyes which differ merely in that the positions of the radicals $R_3$ and $R_4$ are interchanged. Particularly preferred mixtures are thus those which comprise a reactive dye of the formula

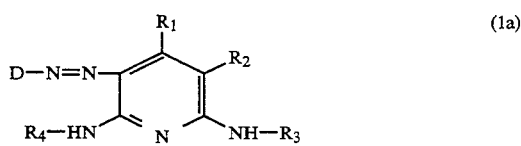

and a reactive dye of the formula

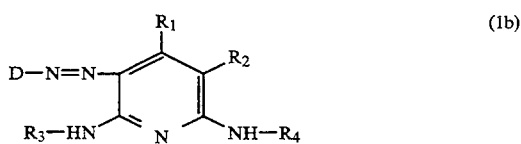

in which the reactive dyes of the formulae (1a) and (1b) differ only in that the positions of the radicals $R_3$ and $R_4$ are interchanged.

The present invention furthermore relates to a process for the preparation of the reactive dyes of the formula (1), which comprises diazotising an amine of the formula $$D-NH_2 \qquad (13),$$

in which D is as defined under formula (1), and coupling the diazotisation product to a coupling component of the formula

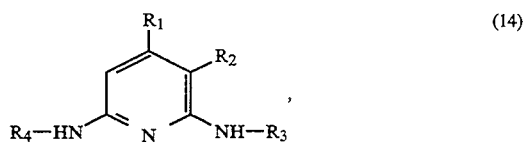

in which $R_1$, $R_2$, $R_3$ and $R_4$ are as defined under formula (1), and if appropriate subsequently carrying out a further conversion reaction.

The diazotisation of the amine of the formulae (13) is as a rule carded out by the action of nitrous acid in aqueous/mineral acid solution at a low temperature, for example 0° to 10° C., and the coupling to the coupling component of the formula (14) is carded out at an acid or neutral to weakly alkaline pH, in particular at a pH of 2 to 8.

A modified embodiment of the process comprises first preparing a dye which contains a precursor of the reactive radical and subsequently converting this into the final stage, for example by esterification or an addition reaction. For example, a dye in which Z is HO—$CH_2CH_2$— can be prepared and this product can be reacted with sulfuric acid such that the hydroxyl group is converted into the sulfato group. The sulfation of the hydroxyl group is carried out, for example, by reaction with concentrated sulfuric acid at about 0° C. to moderately elevated temperature.

The synthesis furthermore can be followed by elimination reactions. For example, reactive dyes of the formula (1) which contain sulfatoethylsulfonyl radicals can be treated with agents which eliminate hydrogen halide, for example sodium hydroxide, whereupon the sulfatoethylsulfonyl radicals are convened into vinylsulfonyl radicals.

In principle, the reactive dyes of the formula (1) can be prepared by starting from precursors or intermediates for dyes which contain fibre-reactive radicals, or these fibre-reactive radicals can be introduced into intermediate products which have a dye character and are suitable for this purpose.

Another interesting process for the preparation of reactive dyes of the formula (1) comprises subjecting a compound of the formula

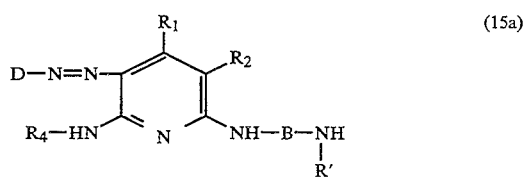

or

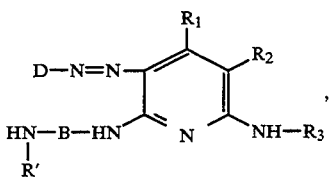
(15b)

in which D, $R_1$, $R_2$, $R_3$ and $R_4$ are as defined under formula (1), R' is hydrogen or $C_1$-$C_{12}$alkyl which is unsubstituted or substituted and, with the exception of methyl, may be interrupted by oxygen, the radical —(NR')— can be a divalent 5- to 7-membered aliphatic heterocyclic radical and B is $C_2$-$C_{12}$alkylene which is unsubstituted or substituted and may be interrupted by oxygen, to a condensation reaction with a fibre-reactive radical of the halotriazine or halopyrimidine series.

The condensation is as a rule carded out in aqueous solution at a temperature of, for example, 0° to 50° C. and a pH of, for example, 4 to 9.

The substituents of the compounds of the formulae (13), (14), (15a) and (15b) are as defined as preferred above.

Fibre-reactive radicals of the halotriazine or halopyrimidine series which can be subjected to a condensation reaction with the compounds of the formulae (15a) and (15b) are, in particular, radicals of the formulae

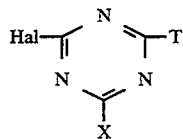
(16)

or

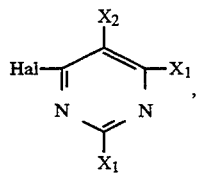
(17)

in which Hal is halogen, in particular chlorine or fluorine, and T, X, $X_1$ and $X_2$ are as defined and as preferred above.

The compounds of the formulae (15a) and (15b) can be obtained by diazotisation of a corresponding amine of the formula (13) and coupling of the diazotisation product to a coupling component of the formula

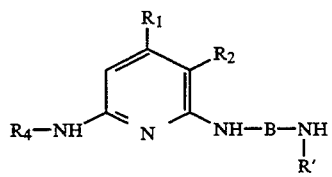
(18a)

or

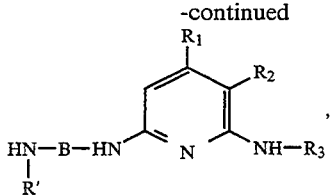
(18b)

by a procedure analogous to that described for the diazotisation of the amine of the formula (13) and the coupling to the coupling component of the formula (14).

The compounds of the formulae (13), (14), (16) and (17) are known or can be prepared analogously to known compounds.

The compounds of the formulae (18a) and (18b) can be obtained by reacting a compound of the formula

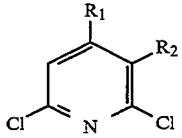
(19)

with amines of the formulae $NH_2R_8$ (20) and $NH_2$—B—NH—R'  (21)

and if appropriate subsequently carrying out a further conversion reaction, B, R', $R_1$ and $R_2$ being as defined above and $R_8$ being as defined for $R_3$ and $R_4$.

The reaction is carried out, for example, at a temperature of about 70° to 120° C., in particular 70° to 90° C., in a solvent, for example N,N-diethylaniline, triethylamine, higher alcohols or ketones, or the amines of the formulae (20) and (21) themselves are used as the solvent.

If the amines of the formulae (20) and (21) are defined differently from one another, then as a rule mixtures of the compounds of the formulae (18) and (18b) are obtained.

By a suitable choice of reaction conditions, however, the chlorine atoms of the compound of the formula (19) can be replaced stepwise, which allows isolation of the individual mono- or disubstitution products.

Thus, in a first step, the chlorine atom in the para-position relative to the radical $R_2$ is chiefly removed at a lower temperature, for example 10° to 50° C., while the chlorine atom in the ortho-position relative to the radical $R_2$ is removed in a second step at a higher temperature, for example 70° to 120° C.

If the amines of the formulae (20) and (21) thus are added not together but in successsion, either the compound of the formula (18a) or the compound of the formula (18b) can be obtained as the main product. It has proved advantageous here for the monosubstituted intermediate product obtained at a lower temperature in the first step to be isolated after the reaction and for the second step, the reaction of the second amine at a higher temperature, then to be carried out.

If the amine of the formula (20) is therefore added at a low temperature in the first step and the amine of the formula (21) is added at a higher temperature in the second step, the compound of the formula (18a) is obtained as the main compound. If the amines are employed in the reverse sequence, the compound of the formula (18b) is obtained as the main compound.

It has proved to be advantageous to employ the amine of the formula (21) in a large excess.

The reactive dyes according to the invention of the formula (1) are present either in the form of their free acid or preferably as salts thereof.

Examples of suitable salts are the alkali metal salts, alkaline earth metal salts or ammonium salts or the salts of an organic amine. Examples are the sodium salts, lithium salts, potassium salts or ammonium salts or the salt of mono-, di- or triethanolamine.

The reactive dyes of the formula (1) are suitable for dyeing and printing widely varying materials, such as fibre materials containing hydroxyl groups or nitrogen. Examples are silk, leather, wool, polyamide fibres and polyurethanes, and in particular all types of cellulosic fibre materials. Such cellulosic fibre materials are, for example, the naturally occurring cellulosic fibres, such as cotton, linen and hemp, and cellulose and regenerated cellulose. The reactive dyes of the formula (1) are also suitable for dyeing or printing fibres containing hydroxyl groups which are contained in blend fabrics, for example blends of cotton with polyester fibres or polyamide fibres. The reactive dyes of the formula (1) are particularly suitable for dyeing or printing cellulosic fibre materials or, in particular, naturally occurring or synthetic polyamide fibre materials.

The dyes according to the invention can be applied to the fibre material and fixed to the fibre in various ways, in particular in the form of aqueous dye solutions and printing pastes. They are suitable both for the exhaust process and for dyeing by the pad-dyeing process, in which the goods are impregnated with aqueous dye solutions, which contain salts if appropriate, and the dyes are fixed, after treatment with an alkali or in the presence of an alkali and if appropriate with the action of heat. They are particularly suitable for the so-called cold pad-batch process, in which the dye is applied on the padder together with the alkali and, after storing at room temperature for several hours, is then fixed. After fixing, the dyeings or prints are rinsed thoroughly with cold and hot water, if appropriate with the addition of a dispersing agent which promotes diffusion of the non-fixed portions.

The reactive dyes of the formula (1) are distinguished by a high reactivity, good fixing capacity and a very good build-up capacity. They can therefore be employed by the exhaust dyeing process at low dyeing temperatures, and require only short steaming times in the pad-steam process. The degrees of fixing are high and the non-fixed portions can easily be washed out, the difference between the degree of exhaustion and degree of fixing being remarkably low, i.e. the soaping loss is very low. The reactive dyes of the formula (1) are also particularly suitable for printing, in particular on cotton, but also for printing on nitrogen-containing fibres, for example wool or silk or blend fabrics containing wool or silk.

The dyeings and prints produced with the dyes according to the invention have a high colour strength and a high fibre-dye bond stability both in the acid and in the alkaline range, and furthermore a good light-fastness and very good wet-fastness properties, such as fastnesses to washing, water, sea-water, crossdyeing and perspiration, as well as a good fastness to pleating, ironing and rubbing.

The following examples serve to illustrate the invention. The temperatures are in degrees Celcius and pans and percentages are by weight, unless stated otherwise. Parts by weight bear the same relation to parts by volume as the kilogram to the liter.

EXAMPLE 1

187 parts of 2,6-dichloro-3-cyano-4-methylpyridine are introduced into 427 parts of ethanolamine at a temperature of 20° to 30° C. The mixture is stirred at 20° to 30° C. for 2 hours. The clear brown solution is poured onto 3000 parts of ice-water. The precipitate formed is filtered off, washed with water and dried.

180 parts of a mixture of the compounds of the formulae

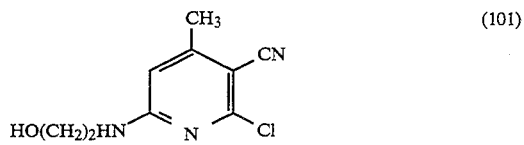

and

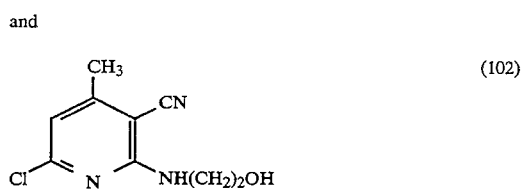

are obtained, the ratio of the compound of the formula (101) to the compound of the formula (102) being 3:1.

180 parts of the mixture of the compounds of the formulae (101) and (102) obtained as described are introduced into 630 parts of 1,3-diaminopropane at a temperature of 100° C. The mixture is subsequently stirred at a temperature of 100° C. for one hour. 45 parts of sodium carbonate are sprinkled into the clear solution at this temperature. The excess 1,3-diaminopropane is distilled off under a reduced vacuum. 500 parts of water are added to the residue and the organic phase is separated off at room temperature. For crystallisation, the organic phase is dissolved in 600 parts of isopropanol and the solution is acidified with 85 parts of hydrochloric acid (37%). The mixture is stirred at a temperature of 0° to 5° C. and the resulting precipitate is filtered off. After drying, 125 parts of a mixture of the compounds of the formulae

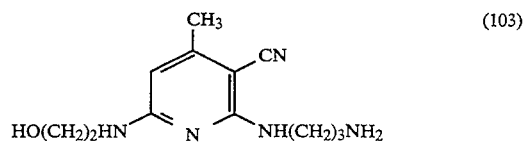

and

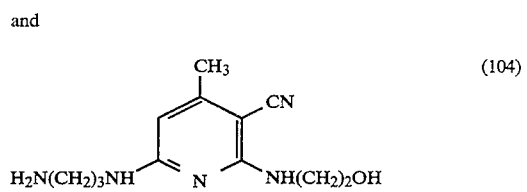

are obtained, the ratio of the compound of the formula (103) to the compound of the formula (104) being 3:1.

EXAMPLE 2

187 parts of 2,6-dichloro-3-cyano-4-methylpyridine are introduced into 630 parts of 1,3-diaminopropane at a temperature of 20° to 30° C. The mixture is stirred at 20° to 30° C. for 2 hours.

The brown suspension is filtered off and the residue is washed with ice-water and dried. About 150 parts of a mixture comprising about 75% of

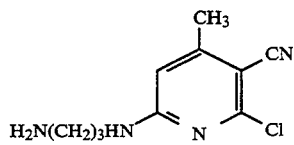

and about 25% of

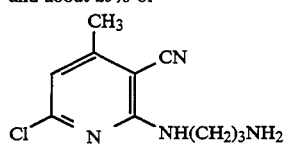

are obtained.

150 parts of the above mixture are introduced into 427 parts of ethanolamine at 100° C. The mixture is subsequently stirred at 100°–110° C. for 1 hour. 45 parts of sodium carbonate are sprinkled onto the clear brown solution. The excess ethanolamine is distilled off in vacuo, 500 parts of water are added to the residue and the organic phase is separated off at room temperature. For crystallisation, the organic phase is dissolved in 600 parts of isopropanol and the solution is acidified with 85 parts of 37 % hydrochloric acid. The mixture is stirred at 0° to 5° C. and the resulting precipitate is filtered off. After drying, about 110 parts of a mixture of about 75% of

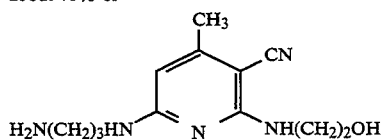

and about 25% of

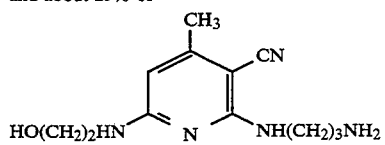

are obtained.

EXAMPLES 3 TO 12

Mixtures of 2,6-diaminopyridine compounds which comprise the 2,6-diaminopyridine compound shown in column 2 in the following Table 1 as the main component can be obtained analogously to Example 1. The components of the mixtures differ only in that the definitions of the amino radicals in the 2- and 6-position are interchanged.

TABLE 1

| Example | 2,6-Diaminopyridine compound |
|---|---|
| 3 | ![](CH3, CN, HO3SO(CH2)2HN-N-NH(CH2)3NH2) |
| 4 | ![](CH3, CN, H3C(CH2)3HN-N-NH(CH2)6NH2) |
| 5 | ![](CH3, CONH2, HO3SO(CH2)3HN-N-NH(CH2)2NH2) |
| 6 | ![](CH3, CN, HO(CH2)3HN-N-NH(CH2)3NH2) |
| 7 | ![](CH3, CN, H3C(CH2)2HN-N-NH(CH2)2NH2) |
| 8 | ![](CH3, CONH2, HO3SO(CH2)2O(CH2)2HN-N-NH(CH2)3NH2) |
| 9 | ![](CH3, CN, HO(CH2)2HN-N-NH(CH2)6NH2) |
| 10 | ![](CH3, CN, H3C(CH2)4HN-N-NH(CH2)2NH2) |
| 11 | ![](CH3, CN, HO(CH2)2HN-N-NH(CH2)2NH2) |
| 12 | ![](CH3, CONH2, HO3SO(CH2)2HN-N-NH(CH2)3NH2) |

EXAMPLE 13

28 parts of aniline-4-β-sulfatoethyl sulfone in 300 parts of an ice-water suspension are dissolved by adding sodium bicarbonate solution to pH 4. 14 parts of cyanuric fluoride are uniformly added dropwise to the solution at a temperature of 0° to 5° C. in the course of 10 minutes, the pH is kept at 4 to 4.5 by addition of further sodium bicarbonate solution, and the mixture is then subsequently stirred for 15 minutes.

A suspension of 500 parts of water and 45 parts of a mixture of the compounds of the formulae

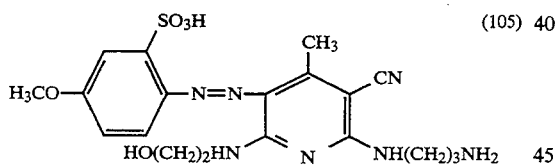
(105)

and

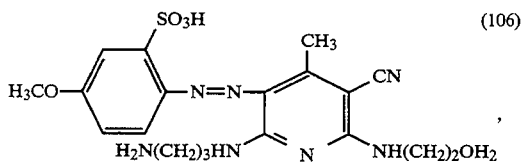
(106)

is then added to this solution and the mixture is adjusted to a pH of 8 using sodium carbonate solution and subsequently stirred for 2 hours at a pH of 7 to 8 and a temperature of 20° to 30° C. After complete condensation, the resulting product is precipitated with sodium chloride, isolated with suction on a suction filter and dried at a temperature of 40° to 50° C. A mixture is obtained which comprises the dyes, shown in the form of the free acids, of the formulae

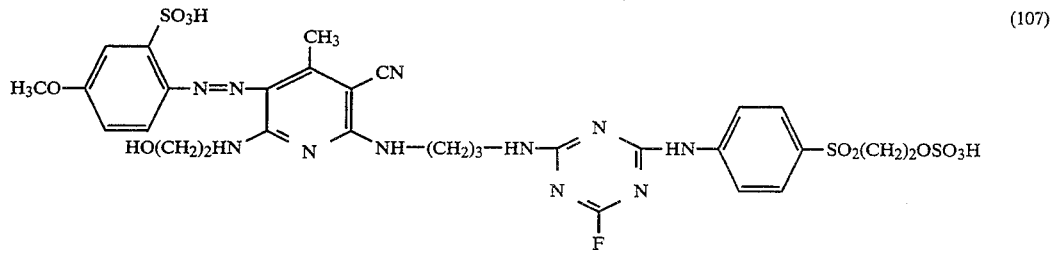
(107)

and

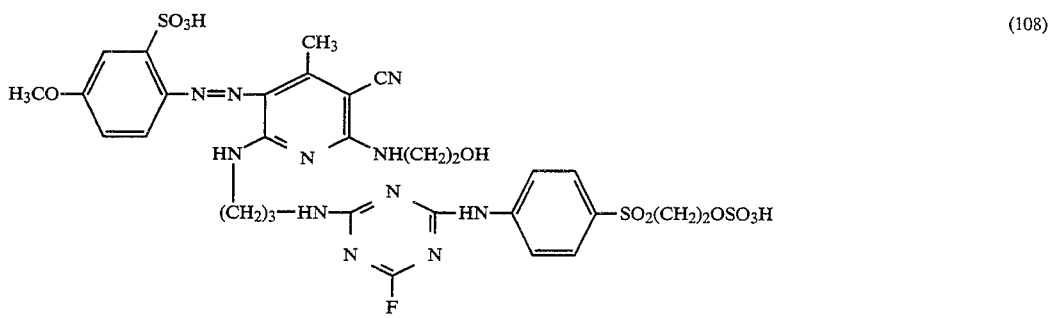
(108)

the dye of the formula (107) being the main component.

The mixture of dyes of the formulae (107) and (108) dyes cotton and wool in brilliant orange shades.

The mixture of compounds of the formulae (105) and (106) can be prepared by diazotisation of 2-sulfo-4-methoxyaniline (by acidification with hydrochloric acid and addition of sodium nitrite) and subsequent coupling to a mixture of the compounds of the formulae (103) and (104) obtainable according to Example 1.

EXAMPLE 14

28 parts of aniline-4-β-sulfatoethyl sulfone in 300 parts of an ice-water suspension are dissolved by addition of a sodium bicarbonate solution to a pH of 4. A solution of 19 parts of cyanuric chloride in acetone is allowed to run into the solution in the course of 30 minutes and the pH is kept at 4 to 4.5 by addition of further sodium bicarbonate solution. When the condensation reaction is complete, when no further free amine is detectable by a diazotisation sample, a solution of 18.8 parts of 1,3-phenylenediamine-4-sulfonic acid and 200 parts of water is added at a pH of 4 to 5. The mixture is then subsequently stirred at room temperature and at a pH of 4 to 5 for 3 hours. The solution thus obtained contains the compound which, in the form of the free acid, has the formula

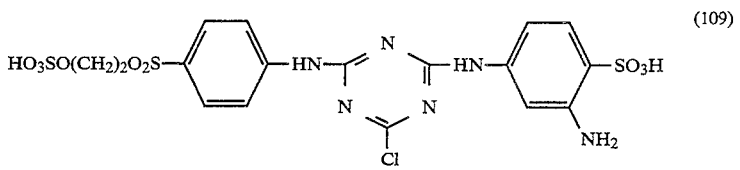
(109)

The solution containing the compound of the formula (109) is diazotised in the customary manner (by acidification with hydrochloric acid and addition of sodium nitrite) and the diazotisation product is coupled to a suspension of 200 parts of water and 24 parts of a coupling component of the formula

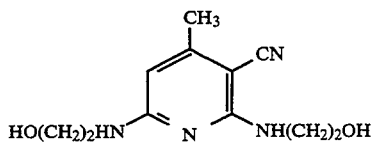
(110)

at a temperature of 0° to 5° C. and at a pH of 5 to 8. After the coupling, the reaction mass is subjected to reverse osmosis and freeze-dried. A dye is obtained which, in the form of the free acid, is the compound of the formula The dye of the formula (111) dyes cotton and wool in brilliant golden yellow shades.

EXAMPLES 15 TO 82

The reactive dyes shown in the form of the free acids in Table 2 can be obtained analogously to Examples 13 and 14. If the reactive dyes shown in Table 2 contain a 2,6-diaminopyridine radical in which the amino radicals bonded in the 2- and 6-position differ from one another, mixtures of reactive dyes which comprise the reactive dyes shown in column 2 in the following Table 2 as the main component are obtained. The components of the mixtures differ only in that the definitions of the amino radicals in the 2- and 6-position of the 2,6-diaminopyridine radical are interchanged. The reactive dyes and reactive dye mixtures shown in column 2 dye cotton and wool in the colour shades shown in column 3.

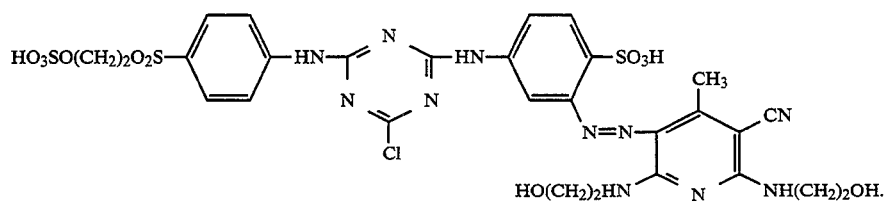
(111)

TABLE 2

| Example No. | Reactive dye | Colour shade |
|---|---|---|
| 15 | [structure] | Yellow |
| 16 | [structure] | Yellow |
| 17 | [structure] | Yellow |
| 18 | [structure] | Yellow |

TABLE 2-continued
| Example No. | Reactive dye | Colour shade |
|---|---|---|
| 19 | 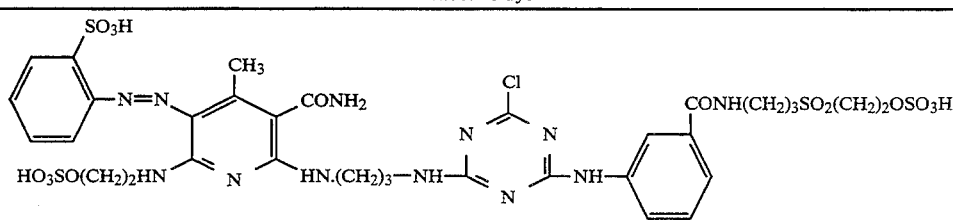 | Yellow |
| 20 | 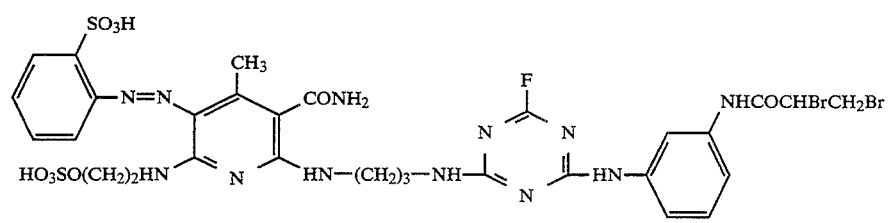 | Yellow |
| 21 | 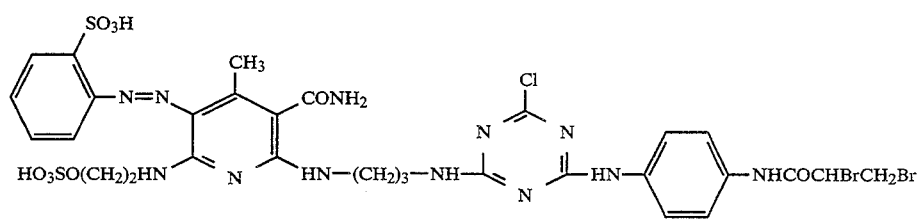 | Yellow |
| 22 | 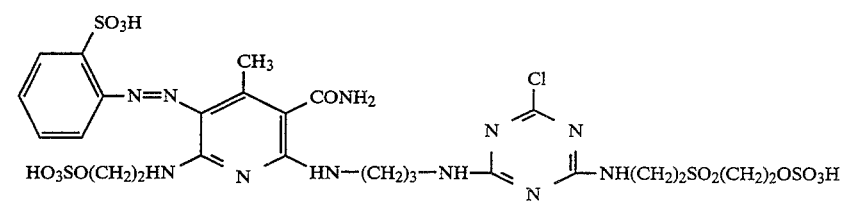 | Yellow |
| 23 | 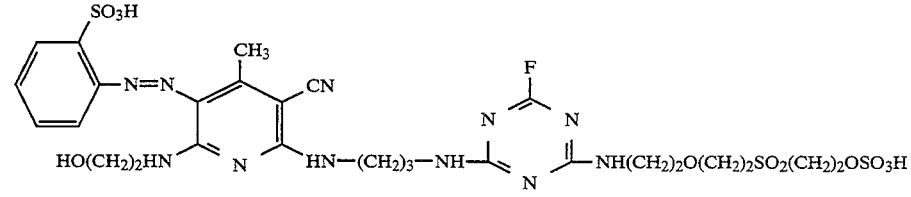 | Yellow |
| 24 | 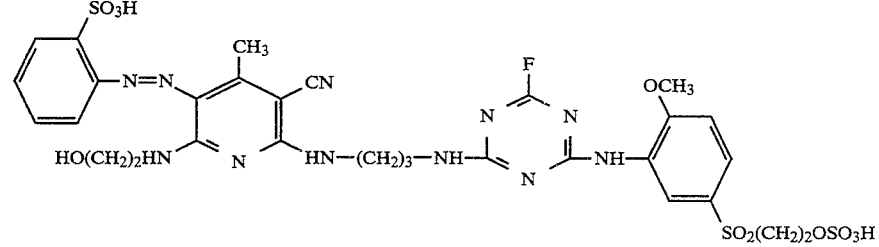 | Yellow |
| 25 | 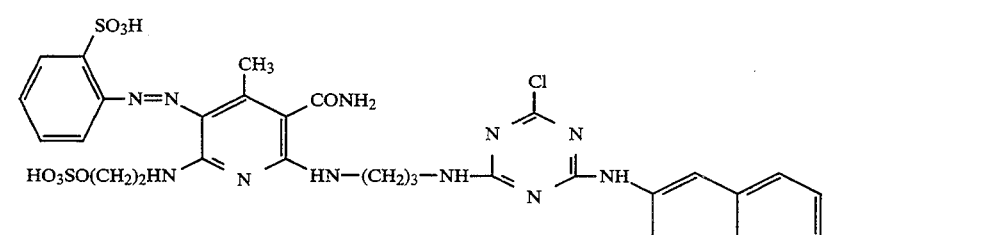 | Yellow |

TABLE 2-continued
| Example No. | Reactive dye | Colour shade |
|---|---|---|
| 26 | 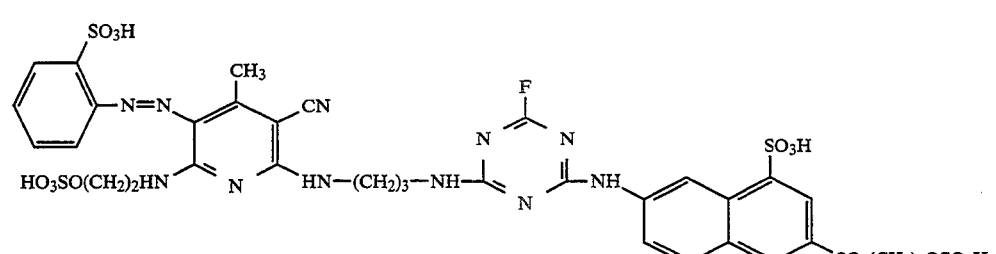 | Yellow |
| 27 | 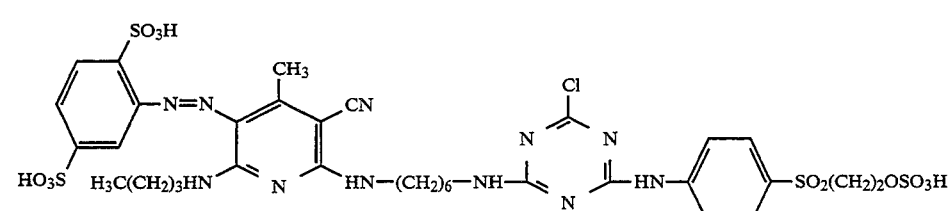 | Yellow |
| 28 | 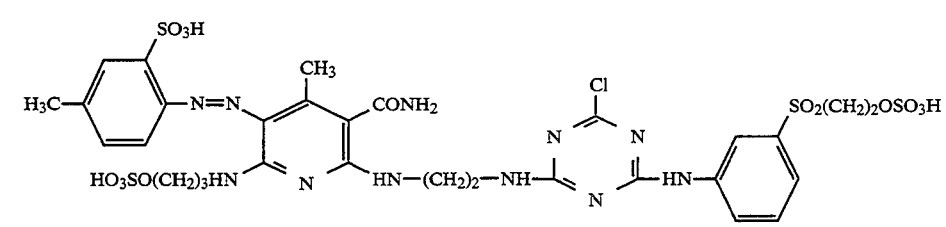 | Golden Yellow |
| 29 | 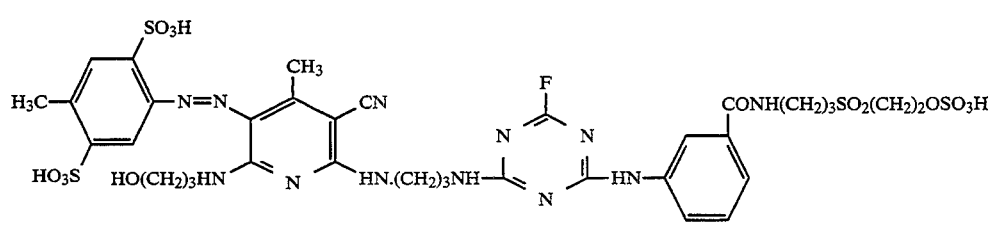 | Golden Yellow |
| 30 | 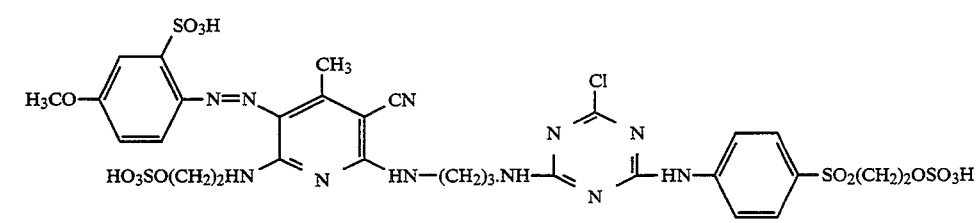 | Yellow |
| 31 | 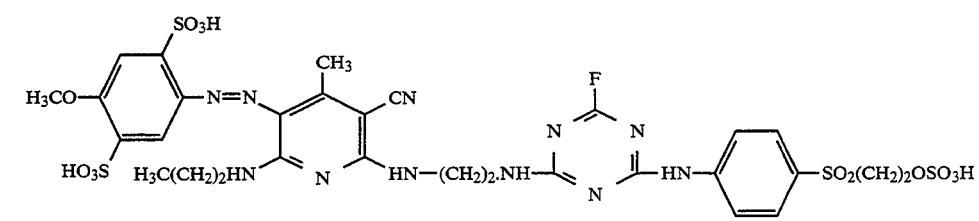 | Yellow |
| 32 | 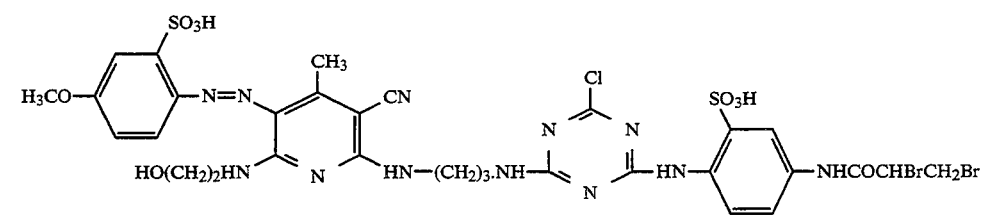 | Orange |

TABLE 2-continued
| Example No. | Reactive dye | Colour shade |
|---|---|---|
| 33 | 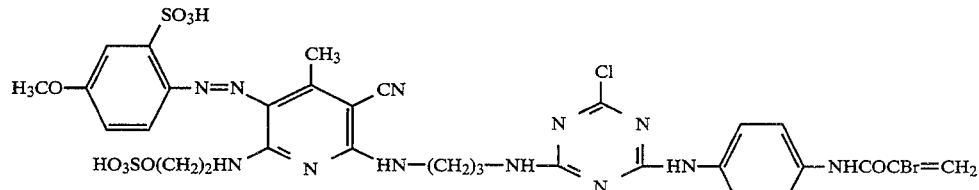 | Orange |
| 34 | 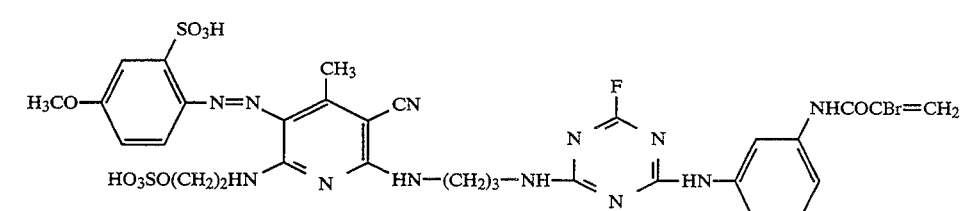 | Orange |
| 35 | 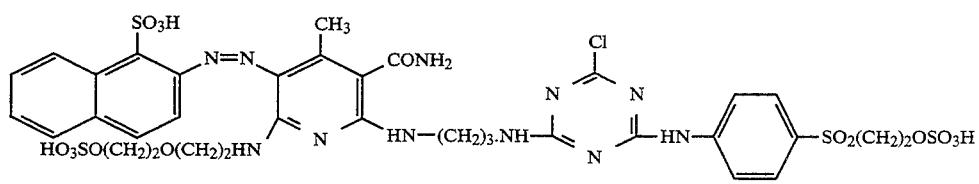 | Orange |
| 36 | 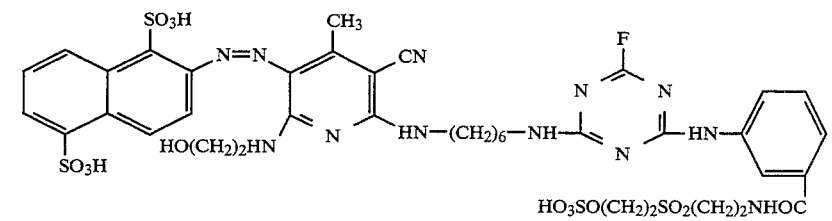 | Orange |
| 37 | 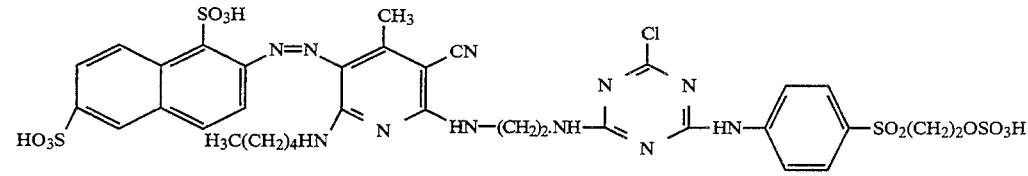 | Orange |
| 38 | 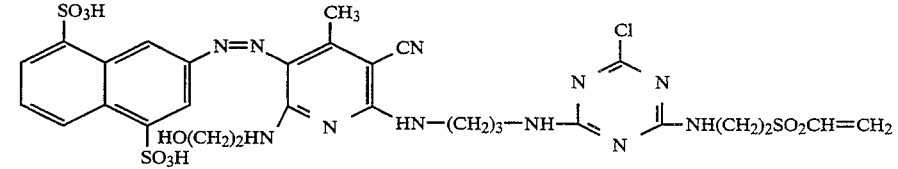 | Orange |
| 39 | 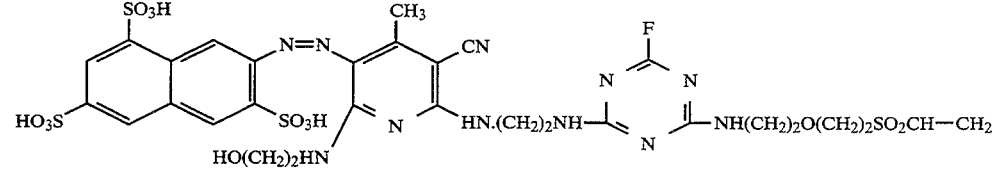 | Orange |

TABLE 2-continued
| Example No. | Reactive dye | Colour shade |
|---|---|---|
| 40 | 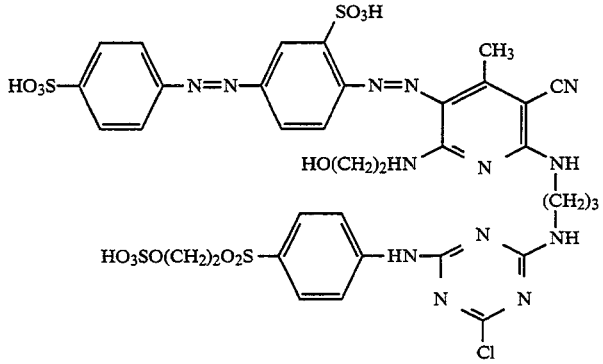 | Red |
| 41 | 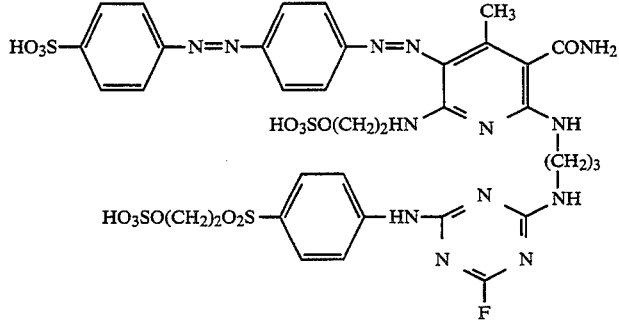 | Red |
| 42 | 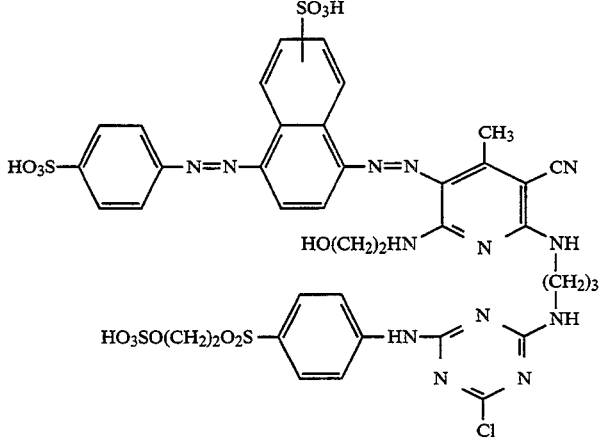 | Red |
| 43 | 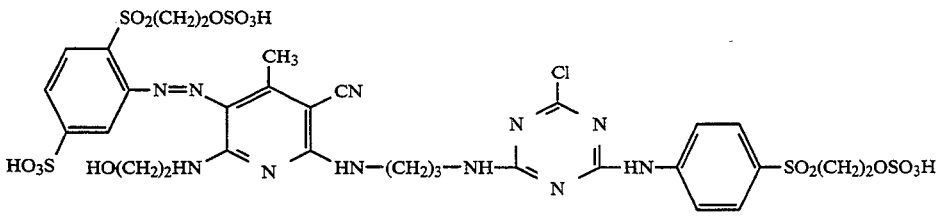 | Orange |

TABLE 2-continued
| Example No. | Reactive dye | Colour shade |
|---|---|---|
| 44 | 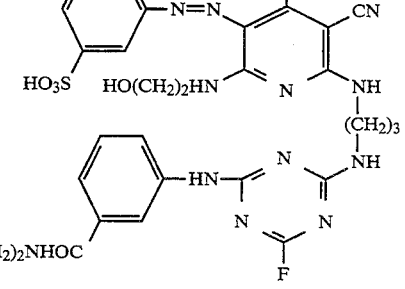 | Orange |
| 45 | 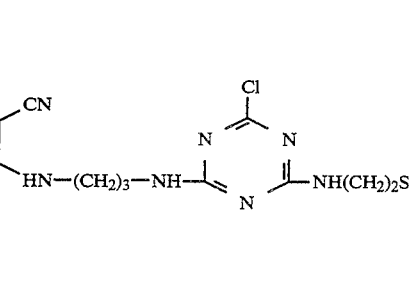 | Orange |
| 46 | 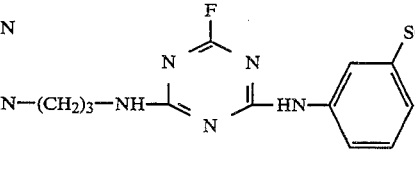 | Orange |
| 47 | 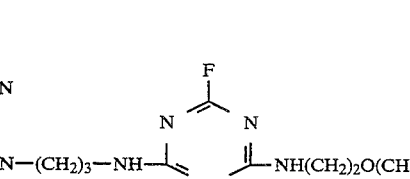 | Orange |
| 48 | 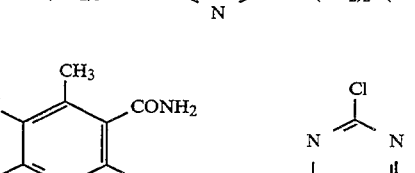 | Yellow |
| 49 | 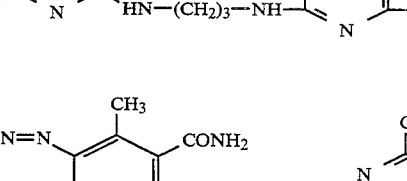 | Yellow |
| 50 | 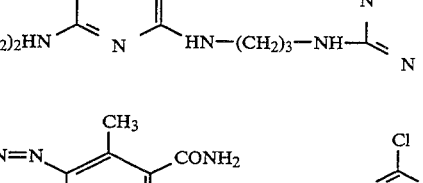 | Yellow |

TABLE 2-continued

| Example No. | Reactive dye | Colour shade |
|---|---|---|
| 51 | (structure) | Yellow |
| 52 | (structure) | Yellow |
| 53 | (structure) | Yellow |
| 54 | (structure) | Yellow |
| 55 | (structure) | Yellow |
| 56 | (structure) | Yellow |

TABLE 2-continued
| Example No. | Reactive dye | Colour shade |
|---|---|---|
| 57 | 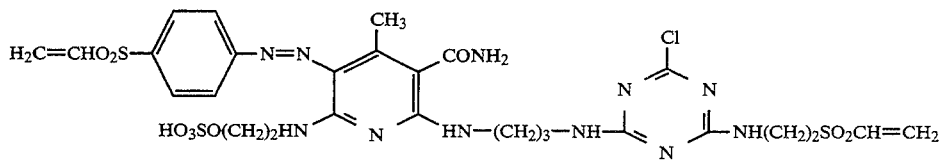 | Yellow |
| 58 | 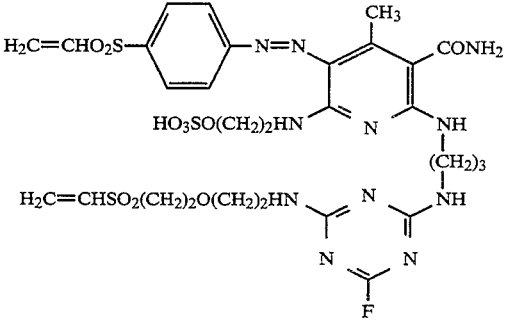 | Yellow |
| 59 | 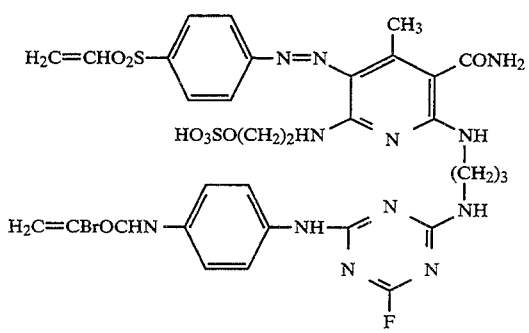 | Yellow |
| 60 | 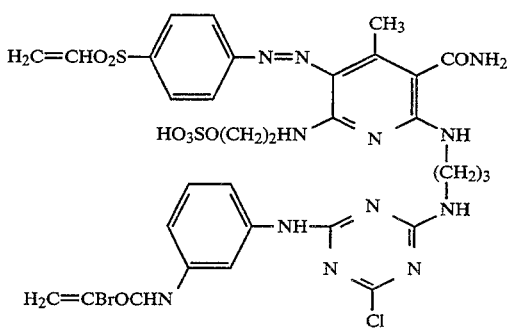 | Yellow |
| 61 | 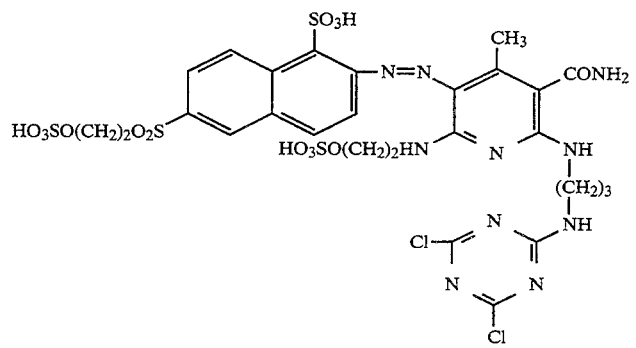 | Orange |

TABLE 2-continued
| Example No. | Reactive dye | Colour shade |
|---|---|---|
| 62 | 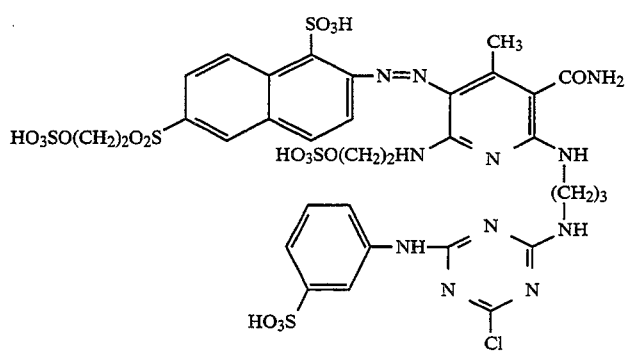 | Orange |
| 63 | 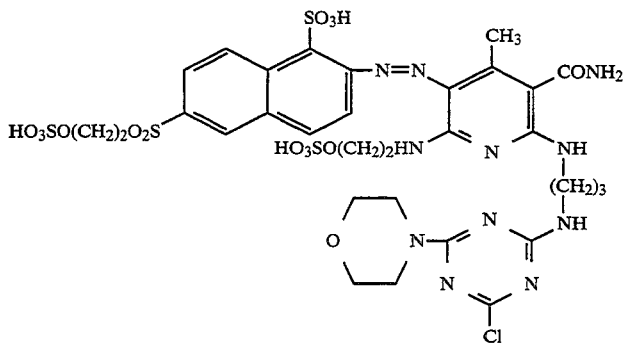 | Orange |
| 64 | 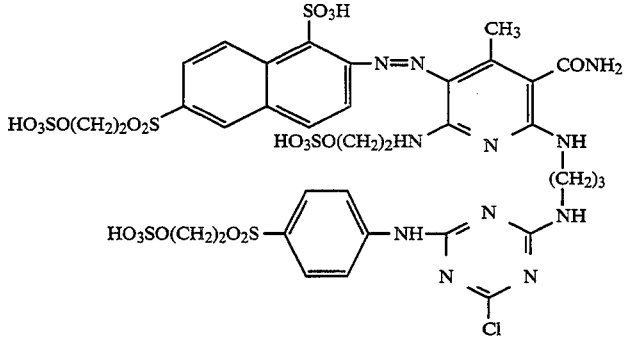 | Orange |
| 65 | 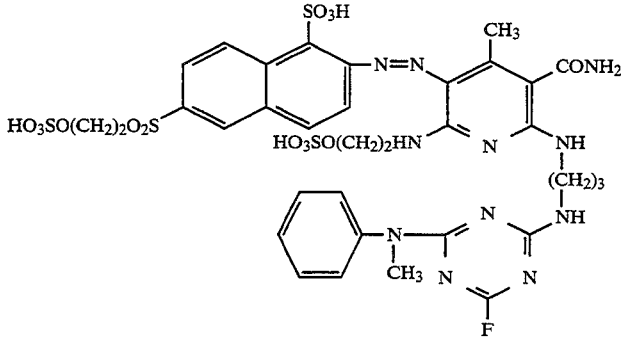 | Orange |

TABLE 2-continued
| Example No. | Reactive dye | Colour shade |
|---|---|---|
| 66 | 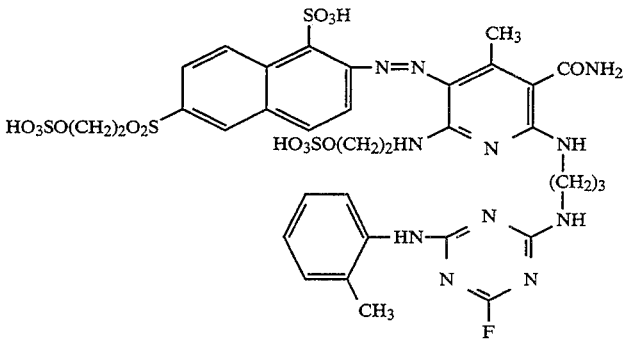 | Orange |
| 67 | 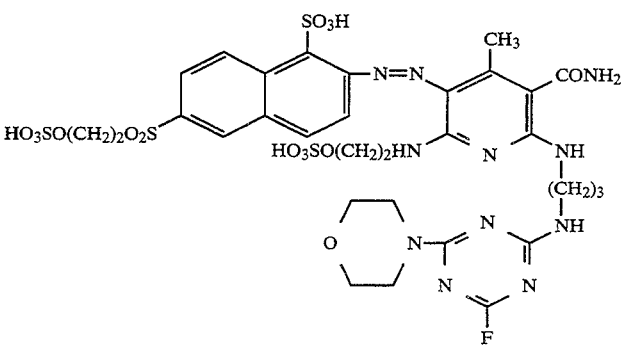 | Orange |
| 68 | 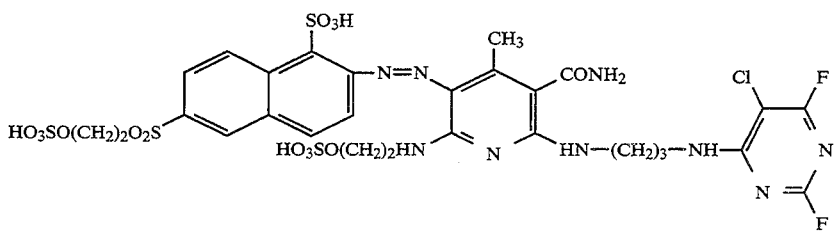 | Orange |
| 69 | 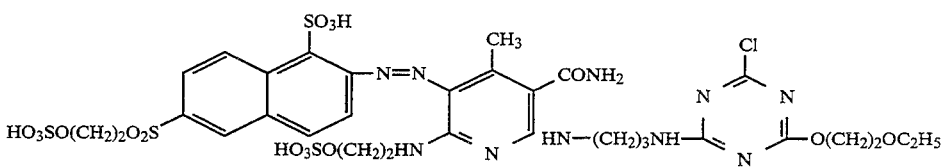 | Orange |
| 70 | 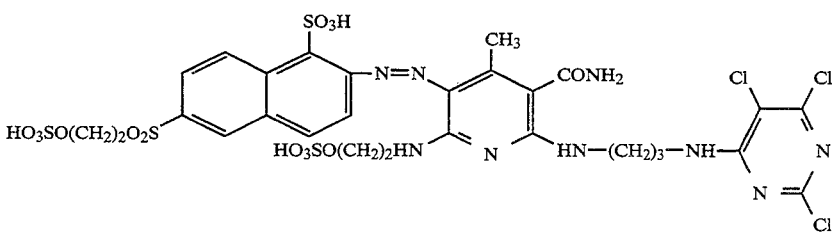 | Orange |
| 71 | 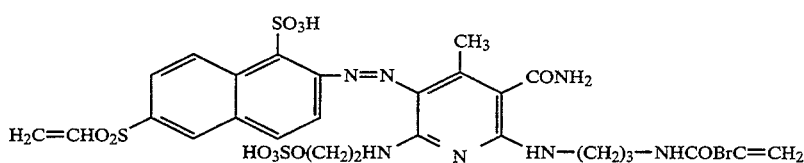 | Orange |

TABLE 2-continued
| Example No. | Reactive dye | Colour shade |
|---|---|---|
| 72 | 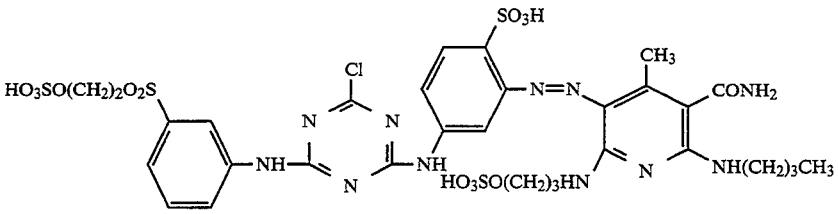 | Yellow |
| 73 | 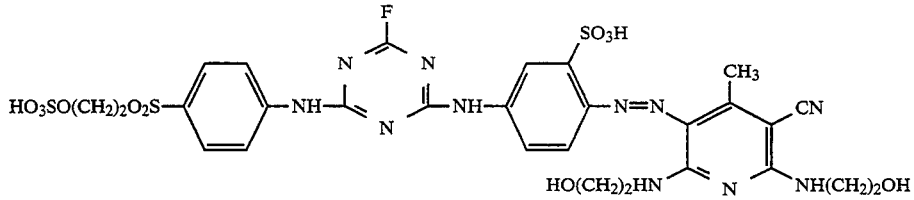 | Orange |
| 74 | 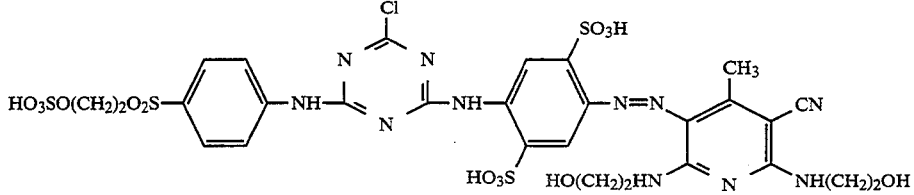 | Orange |
| 75 | 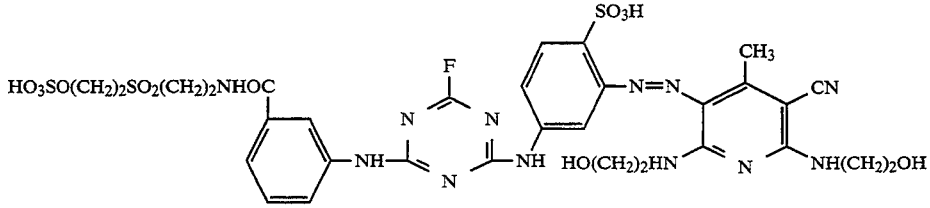 | Yellow |
| 76 | 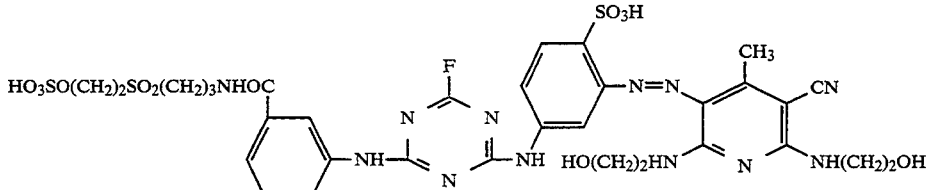 | Yellow |
| 77 | 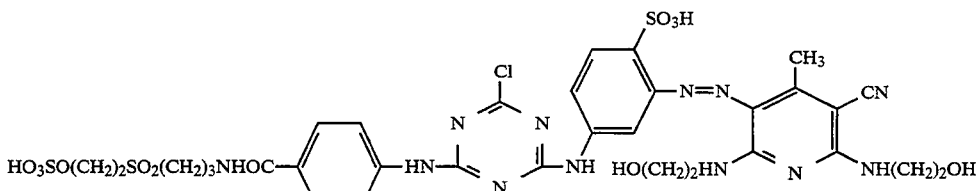 | Yellow |
| 78 | 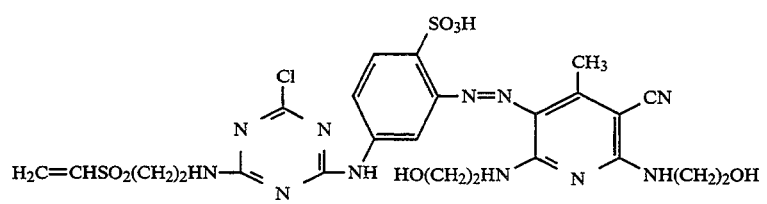 | Yellow |

TABLE 2-continued
| Example No. | Reactive dye | Colour shade |
|---|---|---|
| 79 | 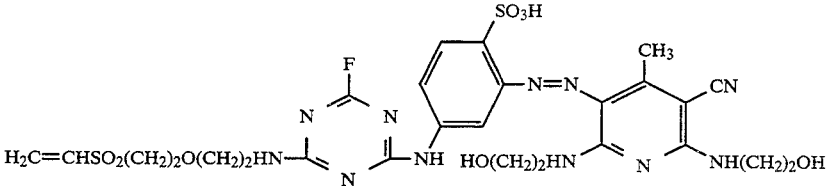 | Yellow |
| 80 | 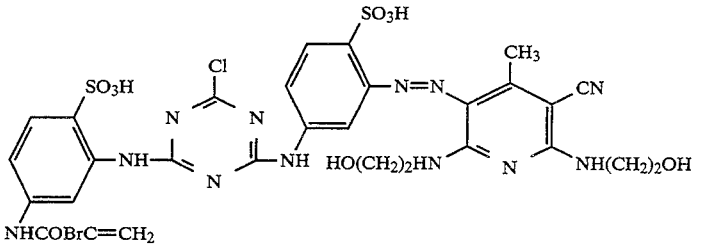 | Yellow |
| 81 | 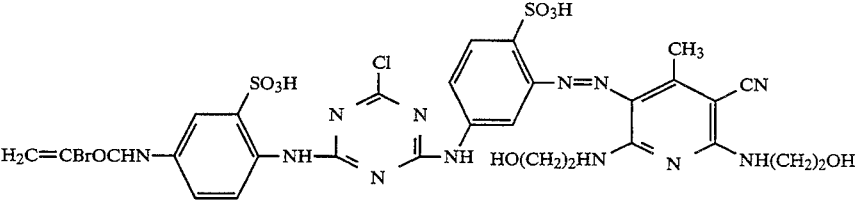 | Yellow |
| 82 | 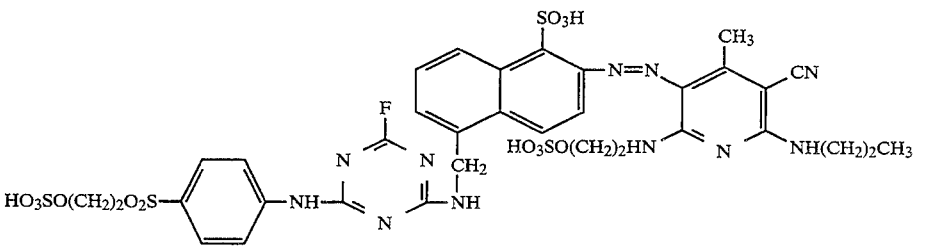 | Orange |
| 83 | 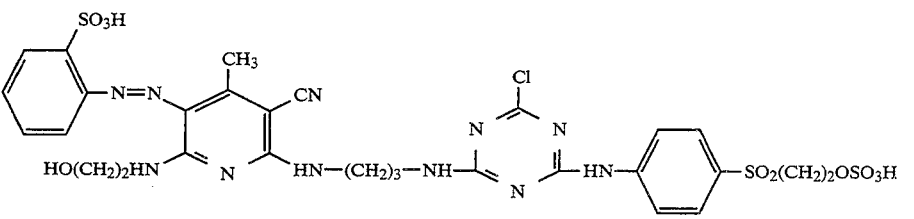 | Yellow |
| 84 | 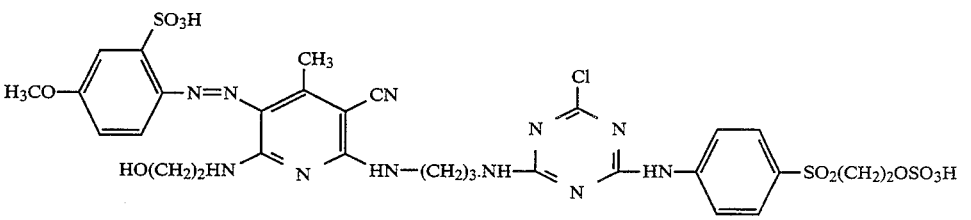 | Orange |
| 85 | 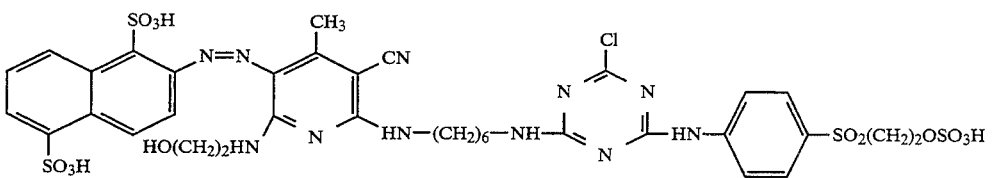 | Orange |

TABLE 2-continued

| Example No. | Reactive dye | Colour shade |
|---|---|---|
| 86 | 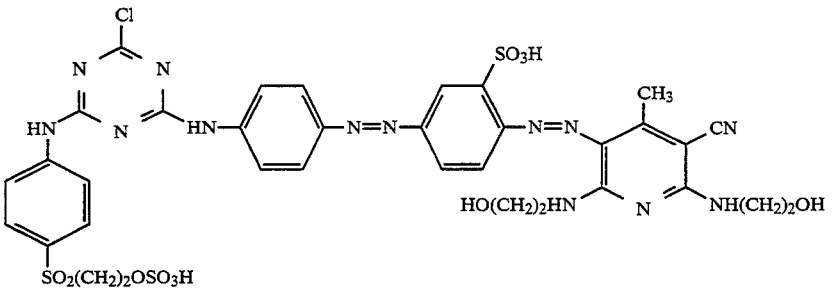 | Red |
| 87 | 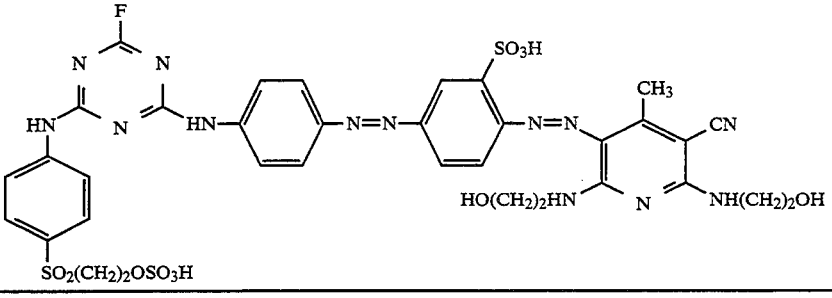 | Red |

Dyeing Instructions 2 parts of the reactive dye obtained according to Example 13 are dissolved in 400 parts of water; 1500 parts of a solution containing 53 g of sodium chloride per liter are added. 100 parts of cotton fabric are introduced into this dyebath at 40° C. After 45 minutes, 100 parts of a solution which contains 16 g of sodium hydroxide and 20 g of calcined sodium carbonate per liter are added. The temperature of the dyebath is kept at 40° C. for a further 45 minutes. Thereafter, the dyed goods am rinsed, soaped at the boil with a nonionic detergent for a quarter of an hour, rinsed again and dried.

Printing Instructions 3 parts of the reactive dye obtained according to Example 13 are sprinkled into 100 parts of a stock thickener mixture comprising 50 parts of 5% sodium alginate thickener, 27.8 parts of water, 20 parts of urea, 1 part of sodium m-nitrobenzenesulfonate and 1.2 parts of sodium bicarbonate while stirring rapidly. A cotton fabric is printed with the printing paste thus obtained and is dried, and the resulting printed material is steamed in saturated steam at 102° C. for 2 minutes. The printed fabric is then rinsed, soaped at the boil, if appropriate, and rinsed again, and then dried.

What is claimed is:

1. A reactive dye of the formula

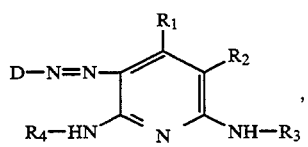

in which D is the radical of a diazo compound of the benzene or naphthalene series or the radical of a mono- or disazo dye, $R_1$ is $C_1$-$C_4$alkyl, $R_2$ is cyano, carbamoyl or sulfomethyl and $R_3$ and $R_4$ independently of one another are hydrogen or $C_1$-$C_{12}$alkyl which is unsubstituted or substituted and, with the exception of methyl, may be interrupted by oxygen, the reactive dye of the formula (1) containing at least two fibre-reactive radicals, at least one fibre-reactive radical being contained in the radical $R_3$ or $R_4$, or the radical D containing a fibre-reactive radical of the halopyrimidine or halotriazine series which is unsubstituted or further substituted, and the reactive dye of the formula (1) contains at least one permanent sulfo or sulfato group.

2. A reactive dye according to claim 1, wherein each of the fibre-reactive radicals is a group of the formula

 (2a)

 (2b)

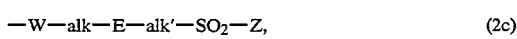 (2c)

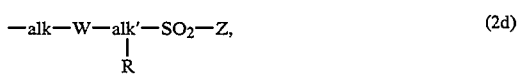 (2d)

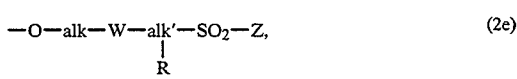 (2e)

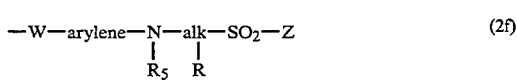 (2f)

or

 (2g)

in which W is a group of the formula —SO$_2$—NR$_5$—, —CONR$_5$— or —NR$_5$CO—,

R$_5$ is hydrogen, C$_1$-C$_4$alkyl which is unsubstituted or substituted by hydroxyl, sulfo, sulfato, carboxyl or cyano, or is a radical of the formula

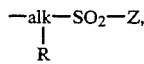

R is hydrogen, hydroxyl, sulfo, sulfato, carboxyl, cyano, halogen, C$_1$-C$_4$alkoxycarbonyl, C$_1$-C$_4$alkanoyloxy, carbamoyl or the group —SO$_2$-Z, Z is a group of the formula —CH=CH$_2$ or —CH$_2$—CH$_2$-U$_1$ and U$_1$ is a leaving group, Z$_1$ is a group of the formula

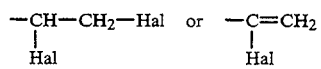

and Hal is halogen,

E is the radical —O— or —NR$_6$, and

R$_6$ is hydrogen or C$_1$-C$_4$alkyl, alk and alk' independently of one another are C$_1$-C$_6$alkylene and arylene is a phenylene or naphthylene radical each of which is unsubstituted or substituted by sulfo, carboxyl, C$_1$-C$_4$alkyl, C$_1$-C$_4$alkoxy or halogen, or a fibre-reactive radical of the formula

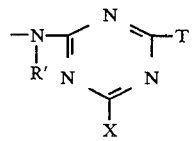

(3)

or

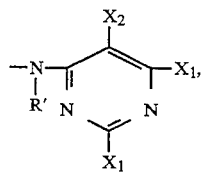

(4)

in which R' is hydrogen or C$_1$-C$_{12}$alkyl which is unsubstituted or substituted by hydroxyl, sulfo or sulfato and, with the exception of methyl, may be interrupted by oxygen, or the radical —(NR')— is a divalent 5- to 7-membered aliphatic heterocyclic radical, X, X$_1$ and X$_2$ are halogen and T is halogen, hydroxyl, sulfo, C$_1$-C$_4$alkoxy, C$_1$-C$_4$alkylthio, C$_1$-C$_4$alkylsulfonyl, phenylsulfonyl, morpholino or unsubstituted or substituted amino, or T is a fibre-reactive radical of the formula

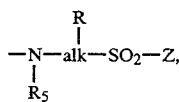

(5a)

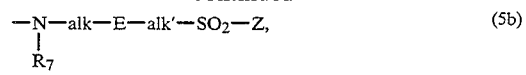

(5b)

(5c)

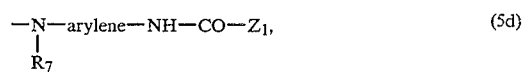

(5d)

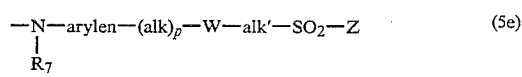

(5e)

or

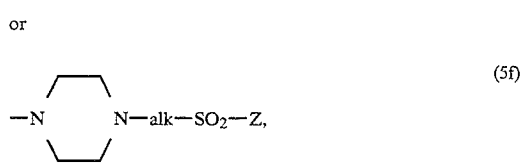

(5f)

in which R, R$_5$, E, W, Z, Z$_1$, alk, alk' and arylene are as defined above,

R$_7$ is hydrogen or C$_1$-C$_4$alkyl and p is 0 or 1.

3. A reactive dye according to claim 2, in which R$_3$ and R$_4$ independently of one another are hydrogen, C$_1$-C$_{12}$alkyl which is unsubstituted or substituted by hydroxyl, sulfo or sulfato and, with the exception of methyl, may be interrupted by oxygen, or a radical of the formula

(6)

in which R' is hydrogen or C$_1$-C$_{12}$alkyl which is unsubstituted or substituted by hydroxyl, sulfo or sulfato and, with the exception of methyl, may be interrupted by oxygen, or the radical —(NR')— is a divalent 5- to 7-membered aliphatic heterocyclic radical, B is C$_2$-C$_{12}$alkylene which is unsubstituted or substituted by hydroxyl, sulfo or sulfato and may be interrupted by oxygen and Y$_1$ is a reactive radical of the formula

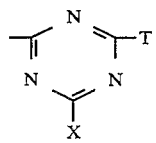

(7)

or

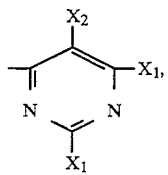

(8)

in which T, X, X$_1$ and X$_2$ are as defined in claim 2.

4. A reactive dye according to claim 2, of the formula

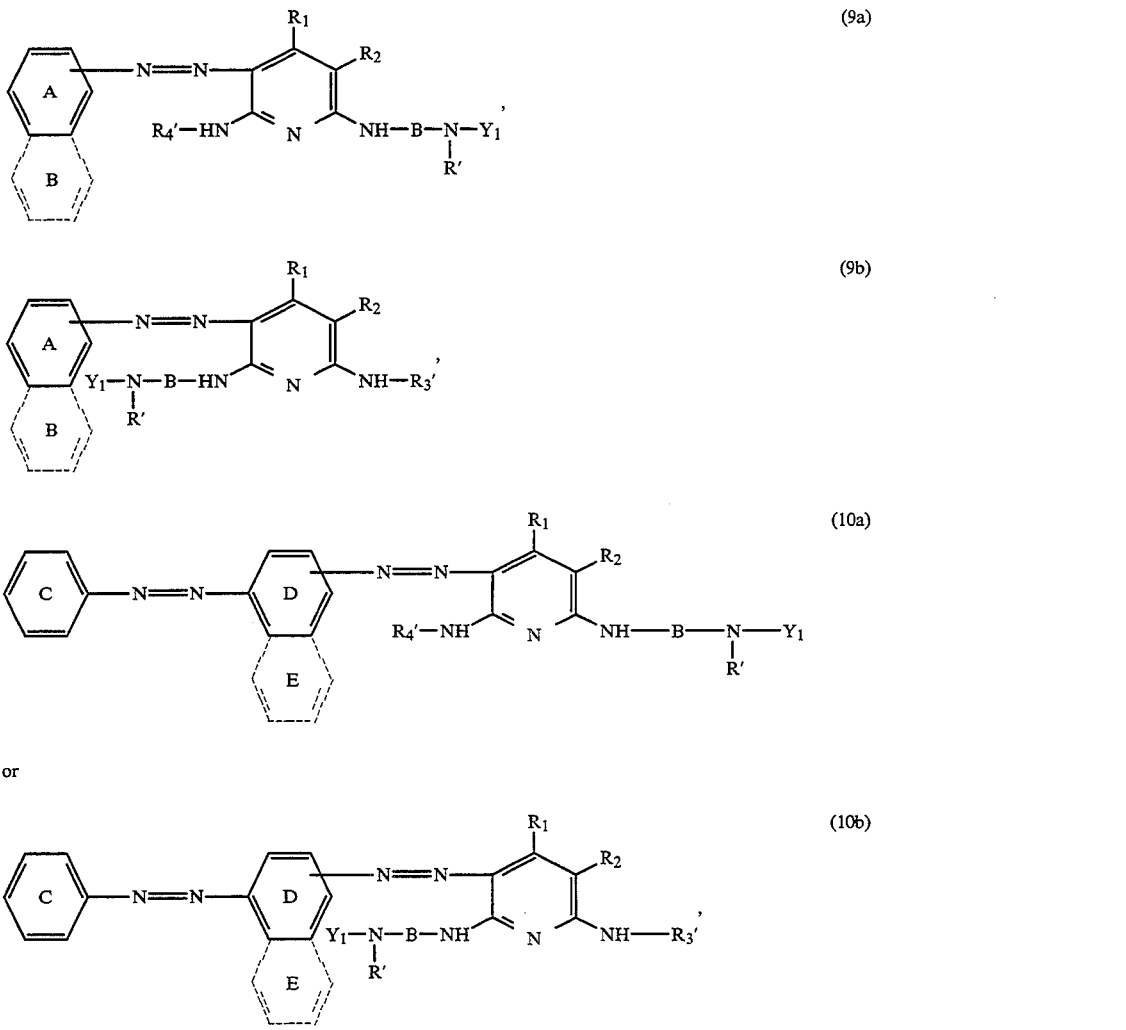

(9a)

(9b)

(10a)

or (10b)

in which $R_1$ is $C_1$–$C_4$alkyl, $R_2$ is cyano, carbamoyl or sulfomethyl, R′, $R_3$′ and $R_4$′ independently of one another are hydrogen or $C_1$–$C_{12}$alkyl which is unsubstituted or substituted by hydroxyl, sulfo or sulfato and, with the exception of methyl, may be interrupted by oxygen, the radical —(NR′)— can be a divalent 5- to 7-membered aliphatic heterocyclic radical, B is $C_2$–$C_{12}$alkylene which is unsubstituted or substituted by hydroxyl, sulfo and sulfato and may be interrupted by oxygen, the rings A, B, C, D and E independently of one another are unsubstituted or substituted by $C_1$–$C_4$alkyl, $C_1$–$C_4$alkoxy, $C_2$–$C_4$alkanoylamino, halogen, sulfo or a reactive radical of the formulae (2a) to (2g) according to claim 2 and $Y_1$ is a fibre-reactive radical of the formula

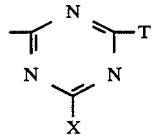

(7)

or

-continued

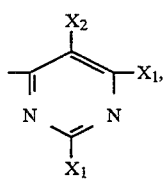

(8)

in which T, X, $X_1$ and $X_2$ are as defined in claim 2.

5. A reactive dye according to claim 2, of the formula

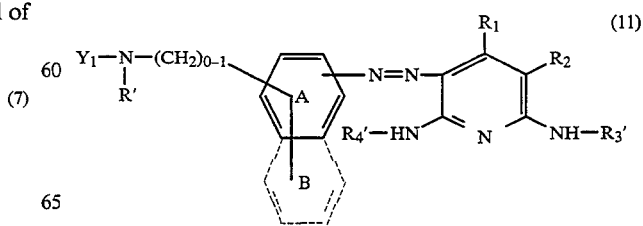

(11)

or

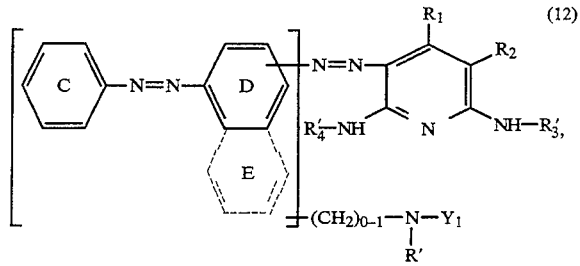

(12)

in which $R_1$ is $C_1$–$C_4$alkyl, $R_2$ is cyano, carbamoyl or sulfomethyl, R', $R_3'$ and $R_4'$ independently of one another are hydrogen or $C_1$–$C_{12}$alkyl which is unsubstituted or substituted by hydroxyl, sulfo or sulfato and, with the exception of methyl, may be interrupted by oxygen, the radical —(NR')— may be a divalent 5- to 7-membered aliphatic heterocyclic radical, the rings A, B, C, D and E independently of one another are unsubstituted or substituted by $C_1$–$C_4$alkyl, $C_1$–$C_4$alkoxy, $C_2$–$C_4$alkanoylamino, halogen, sulfo or a reactive radical of the formulae (2a) to (2g) as defined in claim 2, and $Y_1$ is a fibre-reactive radical of the formula

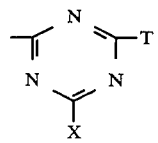

(7)

or (8)

in which T, X, $X_1$ and $X_2$ are as defined in claim 2.

6. A reactive dye according to claim 3, in which B is $C_2$–$C_6$alkylene.

7. A reactive dye according to claim 1, in which $R_1$ is methyl.

8. A reactive dye according to claim 1, in which $R_2$ is cyano or carbamoyl.

9. A reactive dye according to claim 2, in which a divalent 5- to 7-membered aliphatic heterocyclic radical —(NR')— is a radical of the formula $$-N\diagup\diagdown N-.$$

10. A mixture of reactive dyes which comprises at least two reactive dyes of the formula (1) according to claim 1.

11. A process for dyeing or printing fibre material containing hydroxyl groups or nitrogen which comprises the step of applying to the fibre material a tinctorial amount of a reactive dye according to claim 1.

12. A process according to claim 11 wherein the fibre material is cellulosic fibre material or naturally occurring or synthetic polyamide fibre material.

* * * * *